(12) United States Patent
Gao et al.

(10) Patent No.: US 10,082,215 B2
(45) Date of Patent: Sep. 25, 2018

(54) VALVE CONFIGURED FOR REGULATING THE FLOW OF FLUID BETWEEN A DEVICE AND A COOLER

(71) Applicants: GM GLOBAL TECHNOLOGY OPERATIONS LLC, Detroit, MI (US); DYNALLOY, INC., Tustin, CA (US)

(72) Inventors: Xiujie Gao, Troy, MI (US); Nancy L. Johnson, Northville, MI (US); Bret M. Olson, White Lake, MI (US); Vijay A. Neelakantan, Rochester Hills, MI (US); Tyler P. Ownby, Huntington Beach, CA (US); James H. Brown, Temecula, CA (US)

(73) Assignees: GM Global Technology Operations LLC, Detroit, MI (US); Dynalloy, Inc., Tustin, CA (US)

( * ) Notice: Subject to any disclaimer, the term of this patent is extended or adjusted under 35 U.S.C. 154(b) by 101 days.

(21) Appl. No.: 15/253,160

(22) Filed: Aug. 31, 2016

(65) Prior Publication Data
US 2018/0058600 A1  Mar. 1, 2018

(51) Int. Cl.
| F16K 17/38 | (2006.01) |
| F16K 31/00 | (2006.01) |
| F16K 1/12  | (2006.01) |
| F03G 7/06  | (2006.01) |

(52) U.S. Cl.
CPC ............ *F16K 31/002* (2013.01); *F03G 7/065* (2013.01); *F16K 1/12* (2013.01); *Y10T 137/7737* (2015.04)

(58) Field of Classification Search
CPC .......... F16K 31/002; F16K 11/07; F16K 1/14; F16K 1/12; F16K 15/18; F16H 57/04; F03G 7/065
USPC ......... 137/468, 625.38, 625.13, 625.12, 625, 137/599.11; 251/11, 129.06
See application file for complete search history.

(56) References Cited

U.S. PATENT DOCUMENTS

| 3,835,659 | A  | * | 9/1974  | McBride, Jr. | ......... F16K 31/025 |
|           |    |   |         |              | 62/202                |
| 6,367,250 | B1 | * | 4/2002  | Baumbick     | ............... F01D 17/20 |
|           |    |   |         |              | 137/625.62            |
| 8,083,209 | B2 | * | 12/2011 | Kozdras      | ............. G05D 23/1333 |
|           |    |   |         |              | 165/297               |
| 8,123,143 | B2 | * | 2/2012  | Willers      | .............. G05D 23/1333 |
|           |    |   |         |              | 236/101 A             |

(Continued)

*Primary Examiner* — Umashankar Venkatesan
(74) *Attorney, Agent, or Firm* — Quinn IP Law

(57) ABSTRACT

A fluid circuit includes a device, a cooler, and a valve. The valve includes a housing, a sealing member, a biasing device, and an actuator. The sealing member moves inside the housing between a first position and a second position. The actuator includes a smart material that is activated when the temperature of a fluid inside the housing exhibiting at least a first temperature, causing the sealing member to move to the second position. The smart material is deactivated when the fluid is a sufficient number of degrees less than the first temperature, causing the sealing member to move to the first position. The fluid flows from the housing to the device and then to the housing when the sealing member is in the first position. The fluid flows from the housing to the cooler and then to the device when the sealing member is in the second position.

14 Claims, 11 Drawing Sheets

(56) References Cited

U.S. PATENT DOCUMENTS

| | | | |
|---|---|---|---|
| 8,141,790 B2* | 3/2012 | Sheppard | F01P 7/16 236/100 |
| 8,960,562 B2* | 2/2015 | Neelakantan | F16H 57/0413 236/101 A |
| 8,991,719 B2* | 3/2015 | Sheppard | F01M 5/007 165/103 |
| 9,200,713 B2 | 12/2015 | Neelakantan et al. | |
| 9,541,211 B2* | 1/2017 | Qiu | G05D 23/1333 |
| 2009/0026405 A1* | 1/2009 | Sheppard | F16K 15/06 251/364 |
| 2012/0161042 A1* | 6/2012 | Sheppard | F01M 5/007 251/11 |
| 2015/0277453 A1* | 10/2015 | Yajima | F16K 31/002 236/93 R |

* cited by examiner

VALVE CONFIGURED FOR REGULATING THE FLOW OF FLUID BETWEEN A DEVICE AND A COOLER

TECHNICAL FIELD

The disclosure relates to a valve configured for regulating the flow of fluid between a device and a cooler.

BACKGROUND

To operate properly, a device for a vehicle or non-automotive application, such as an HVAC system, may require a supply of fluid, such as conventional device oil. The fluid may be used for such functions as cooling and lubrication. The lubricating and cooling capabilities of device oil systems greatly impact the reliability and durability of the device. Additionally, multi-speed power devices require fluid for controlled engagement and disengagement, on a desired schedule, of the various torque transmitting mechanisms that operate to establish the speed ratios within the internal gear arrangement.

SUMMARY

A valve is configured for directing the flow of fluid received from a device to one of the device and a cooler within a fluid circuit. The valve includes a housing, a sealing member, a biasing device, and an actuator. The housing defines a cavity that extends along a longitudinal axis between a first end and a second end. The cavity is configured for receiving and expelling the fluid. The housing includes a first reaction surface and a second reaction surface, wherein the second reaction surface is disposed in spaced and facing relationship to the first reaction surface along the longitudinal axis.

The sealing member is disposed in the cavity and movable therein along the longitudinal axis between a first position and a second position. The sealing member includes a barrel that extends along the longitudinal axis between a first face and a second face. The sealing member includes a barrel and a flange. The barrel extends along the longitudinal axis to the second face. The flange radially surrounds the longitudinal axis and presents a second side, opposite the first face, such that the second side is disposed in facing relationship to the second reaction surface.

The biasing device is operatively disposed in the cavity to continuously react between the sealing member and the first reaction surface of the housing to apply a first force to the sealing member, in a first longitudinal direction. The actuator radially surrounds the barrel such that the actuator is operatively disposed in the cavity to react between the second side of the sealing member and the second reaction surface of the housing. The actuator is configured to apply a second force to the sealing member, in a second longitudinal direction, opposite the first longitudinal direction. The actuator is configured to be in continuous fluid contact with the fluid. The actuator includes a smart material configured to be activated in response to the temperature of the fluid in the cavity having at least a first temperature such that activation of the smart material activates the actuator.

The smart material is configured to be deactivated in response to a temperature of the fluid in the cavity being a sufficient number of degrees less than the first temperature such that the smart material deactivates the actuator. The first force is greater than the second force when the actuator is deactivated, such that the sealing member moves in the first longitudinal direction from the second position to the first position. The second force is greater than the first force when the actuator is activated, such that the sealing member moves in the second longitudinal direction from the first position to the second position. The fluid is only permitted to flow between the cavity, the cooler, and the device when the sealing member is in the second position. Likewise, the fluid is only permitted to flow from the cavity to the device and from the device to the cavity when the sealing member is in the first position.

The above features and advantages and other features and advantages of the present teachings are readily apparent from the following detailed description of the best modes for carrying out the teachings when taken in connection with the accompanying drawings.

DETAILED DESCRIPTION

Figure 1:
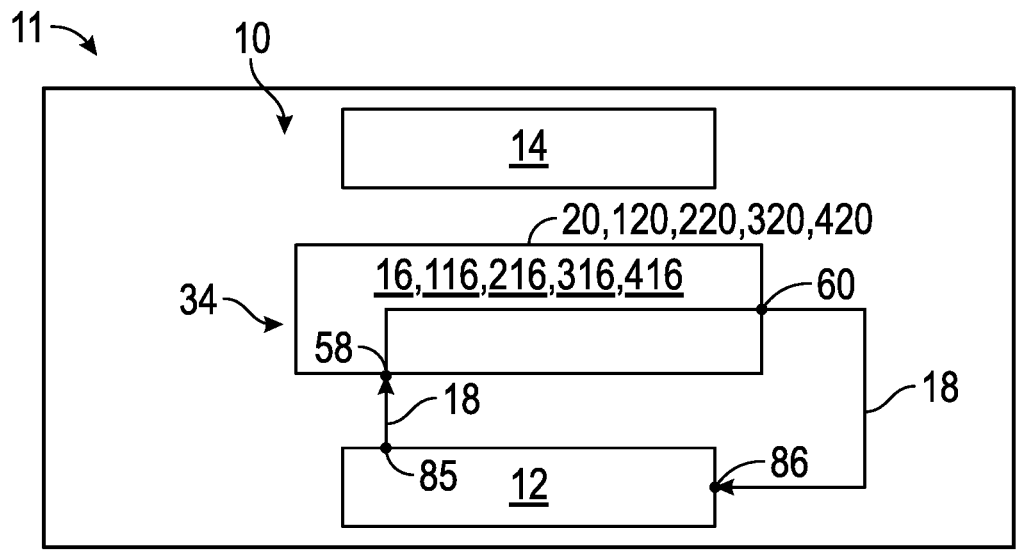
FIG. 1 is a schematic diagram of a fluid circuit including a device, a fluid cooler, and a valve in a first position such that fluid flows from the device, through the valve, and back into the device, bypassing the fluid cooler.
Figure 2:
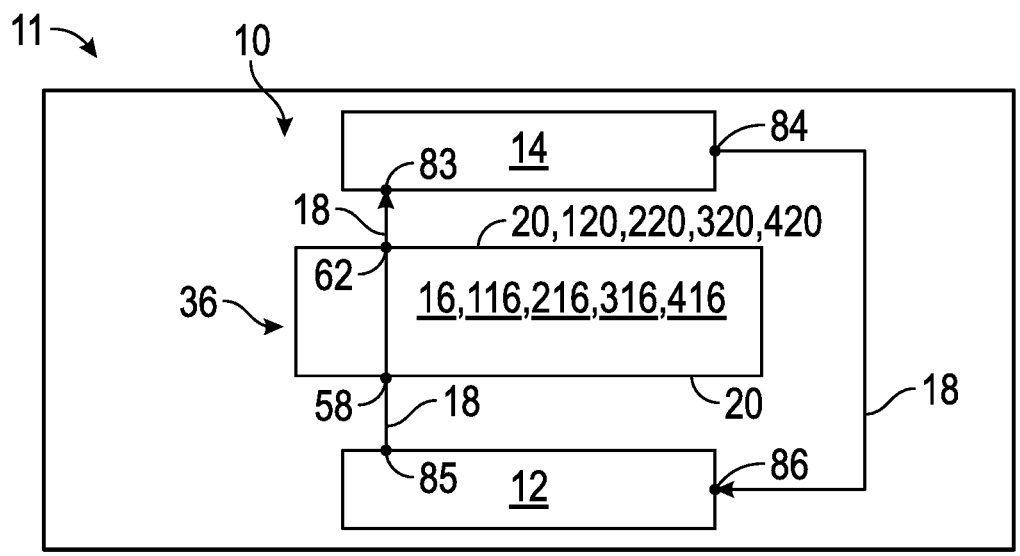
FIG. 2 is the fluid circuit of FIG. 1 with the valve in a second position such that fluid flows in a loop between the device, the valve, and the fluid cooler.

Referring to the Figures, wherein like reference numerals refer to like elements, a fluid circuit is shown generally at 10 in FIGS. 1 and 2. The fluid circuit 10 includes a device 12, a cooler 14, and a valve 16. As will be explained in more detail below, the valve 16 is configured for regulating the circulation of a fluid 18 between the device 12 and the cooler 14. The device 12 may be used for a variety of applications, such as with an automatic transmission for a vehicle 11, which is configured for receiving and expelling the fluid 18. The fluid 18 may be an automatic transmission fluid (ATF) and the like. Furthermore, the device 12 may be incorporated in applications other than vehicles. For example, the device 12 may be incorporated into HVAC systems of buildings, boats, aircraft, appliances, and the like.

The device 12 and the cooler 14 are each in fluid communication with the valve 16. The cooler 14 is configured to cool fluid 18 received therein. During operation, the fluid 18 is exhausted from the device 12 through a device exhausted port 85, and enters the valve 16 through an inlet 58. The valve 16 is configured to move between a first position 34 (FIG. 1) and a second position 36 (FIG. 2) as a function of a temperature of the fluid 18, as will be explained in more detail below. Referring specifically to FIG. 1, when the temperature of the fluid 18 is a sufficient number of degrees below a first temperature, the fluid 18 does not require cooling, and the valve 16 moves to the first position 34, or otherwise remains in the first position 34. When the valve 16 is in the first position 34, the fluid 18 is exhausted from the valve 16 through a first outlet 60, and enters the device 12 through a device intake port 86, thus bypassing the cooler 14. However, referring now to FIG. 2, when the temperature of the fluid 18 at least equal to the first temperature, the fluid 18 requires cooling to a lower temperature, and the valve 16 moves to the second position 36, or otherwise remains in the second position 36. When the valve 16 is in the second position 36, the fluid 18 is exhausted from the valve 16 through a second outlet 62, and enters the cooler 14 through a cooling intake port 83. The fluid 18 is cooled inside the cooler 14, and the cooled fluid 18 is exhausted from the cooler 14 through a cooling exhaust port 84. The cooled fluid 18 then enters the device 12 through the device intake port 86. Therefore, by directing the fluid 18 to the cooler 14 only when the fluid 18 is at least equal to the first temperature, the fluid cooler 14 only operates when the fluid 18 is at least the first temperature, resulting in vehicle energy savings by preventing unnecessary operation of the fluid cooler 14 at temperatures less than the first fluid temperature.

Figure 3:
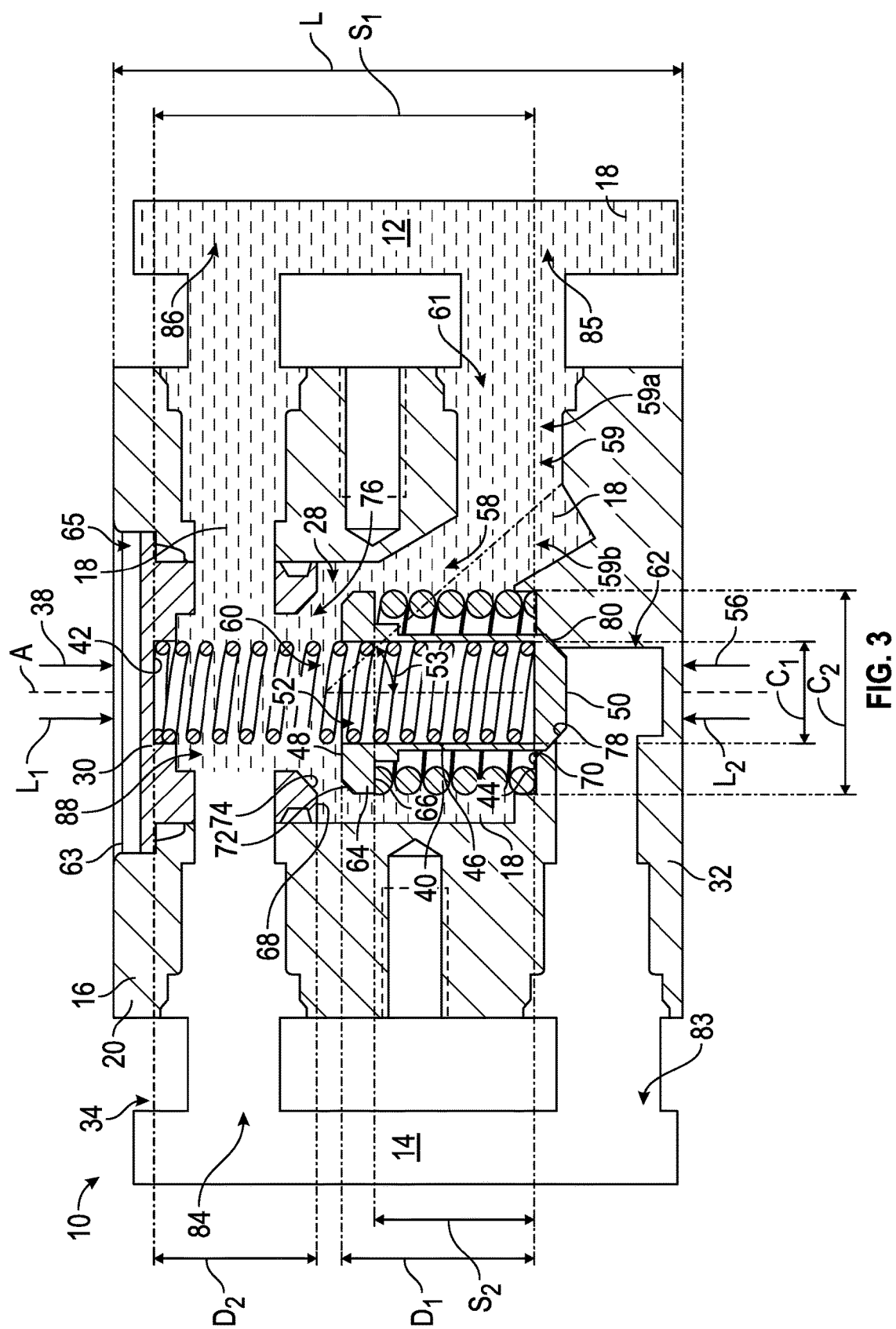
FIG. 3 is a schematic cross-sectional view of the first embodiment of the valve, shown in the first position.
Figure 4:
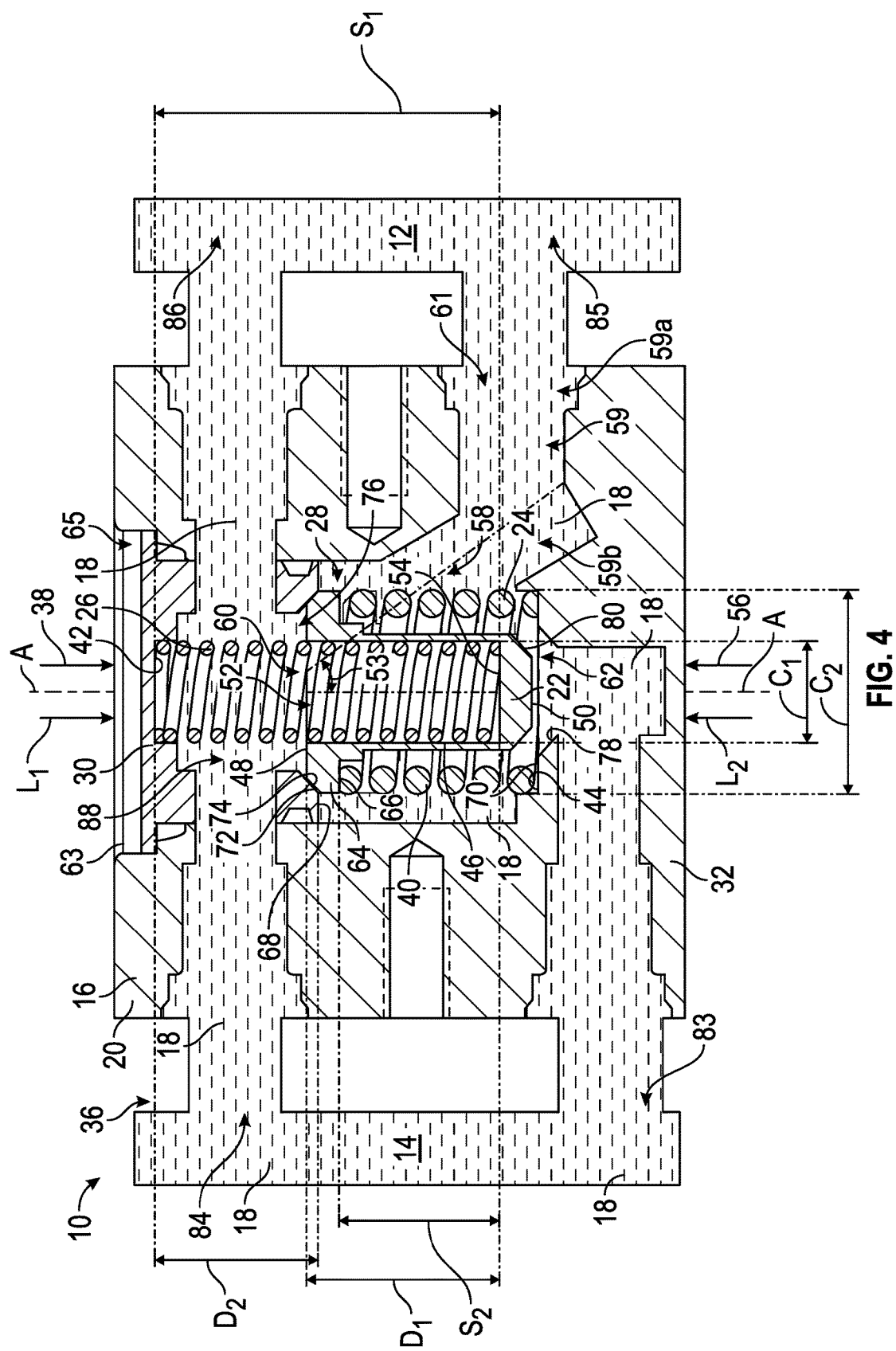
FIG. 4 is a schematic cross-sectional view of the valve of FIG. 3, shown in the second position.

Referring now to the valve 16 shown in FIGS. 3 and 4, the valve 16 includes a housing 20, a sealing member 22, an actuator 24, and a biasing device 26. The housing 20 defines a cavity 28 that extends along a longitudinal axis A between a first end 30 and a second end 32. The cavity 28 is configured for receiving and expelling the fluid 18. The housing 20 includes a first reaction surface 42 and a second reaction surface 44. The second reaction surface 44 is disposed along the longitudinal axis A in spaced and facing relationship to the first reaction surface 42.

The sealing member 22 is disposed in the cavity 28, between the first reaction surface 42 and the second reaction surface 44. The sealing member 22 is movable therein along the longitudinal axis between the first position 34 (FIG. 3) and the second position 36 (FIG. 4), as a function of the temperature of the fluid 18 within the cavity 28. The sealing member 22 includes a barrel 46 that extends along the longitudinal axis A between a first face 48 and a second face 50. The first face 48 defines a first recess 52 that extends a first depth $D_1$ along the longitudinal axis A to a first side 54.

The sealing member 22 further includes a flange 64 radially extending from the barrel 46 in generally perpendicular relationship to the longitudinal axis A. The flange 64 presents a second side 66, such that the second side 66 is disposed in facing relationship with the second reaction surface 44.

The biasing device 26 may be a compression spring. A portion of the biasing device 26 is disposed in the first recess 52, such that the biasing device 26 is operatively disposed between the first side 54 of the sealing member 22 and the first reaction surface 42 of the housing 20. As such, the biasing device 26 remains in contact with the first side 54 and the first reaction surface 42 to continuously react there between and apply a first force 38 to the sealing member 22, in a first longitudinal direction $L_1$ along the longitudinal axis A.

The actuator 24 may be a compression spring. The actuator 24 is operatively disposed within the cavity 28 between the second side 66 of the sealing member 22 and the second reaction surface 44 of the housing 20. The actuator 24 is configured to be in continuous fluid contact with the fluid 18. The actuator 24 is configured to react between the second side 66 and the second reaction surface 44 to apply a second force 56 to the sealing member in a second longitudinal direction $L_2$ along the longitudinal axis A, opposite the first longitudinal direction $L_1$.

The actuator 24 includes a shape memory alloy (SMA) material 40 configured to be activated in response to the temperature of the fluid 18 in the cavity 28 having at least a first temperature such that the actuation of the smart material 40, activates the actuator 24, and the actuator 24 longitudinally extends in length. Likewise, the SMA material 40 is configured to be deactivated in response to the fluid 18 in the cavity 28 having a sufficient number of degrees less than the first temperature, such that the SMA material 40 deactivates the actuator 24, and the actuator 24 longitudinally retracts in length. As such, due to the increase in length of the actuator when the actuator 24 is activated, the spring force, i.e., second force 56, applied by the actuator 24 is greater than when the actuator 24 is deactivated.

The SMA material 40 exhibits a temperature hysteresis in its phase transformations. The magnitude of the hysteresis is typically between five degrees and forty degrees Celsius (C). The specific magnitude of the hysteresis in a particular application is a function of several parameters, including the material formulation of the SMA material 40 and the stress state of the SMA material 40.

The SMA material 40 has a crystallographic phase changeable between austenite and martensite in response to exposure to a temperature of at least the first temperature and a temperature below the second temperature, which is typically lower than the first temperature. As used herein, the terminology SMA refers to alloys which exhibit a shape memory effect. That is, the SMA material 40 may undergo a solid state phase change via atomic rearrangement to shift between a martensite phase, i.e., "martensite", and an austenite phase, i.e., "austenite". Stated differently, the SMA material 40 may undergo a displacive transformation rather than a diffusional transformation to shift between martensite and austenite. A displacive transformation is when a structural change occurs by the coordinated movement of atoms (or groups of atoms) relative to their neighbors. In general, the martensite phase refers to the comparatively lower-temperature phase and is often more deformable than the comparatively higher-temperature austenite phase. The temperature at which the shape memory alloy material begins to change from the austenite phase to the martensite phase is known as the martensite start temperature, $M_s$. The temperature at which the SMA material 40 completes the change from the austenite phase to the martensite phase is known as the martensite finish temperature, $M_f$. Similarly, as the SMA material 40 is heated, the temperature at which the SMA material 40 begins to change from the martensite phase to the austenite phase is known as the austenite start temperature, $A_s$. The temperature at which the SMA material 40 completes the change from the martensite phase to the austenite phase is known as the austenite finish temperature, $A_f$.

Therefore, the SMA material 40 may be characterized by a cold state, i.e., when a temperature of the SMA material 40 is below the martensite finish temperature $M_f$ of the SMA material 40. Likewise, the SMA material 40 may also be characterized by a hot state, i.e., when the temperature of the SMA material 40 is above the austenite finish temperature $A_f$ of the SMA material 40.

In operation, SMA material 40 that is pre-strained or subjected to compression stress can change dimension upon changing crystallographic phase to thereby convert thermal energy to mechanical energy. That is, the SMA material 40 may change crystallographic phase from martensite to austenite and thereby dimensionally expand if pseudoplastically pre-strained so as to convert thermal energy to mechanical energy. Conversely, the SMA material 40 may change crystallographic phase from austenite to martensite and if under stress thereby dimensionally contract.

"Pseudoplastically pre-strained" refers to stretching the SMA material 40 while in the martensite phase so that the strain exhibited by the SMA material 40 under that loading condition is not fully recovered when unloaded, where purely elastic strain would be fully recovered. In the case of SMA material 40, it is possible to load the material such that the elastic strain limit is surpassed and deformation takes place in the martensitic crystal structure of the material prior to exceeding the true plastic strain limit of the SMA material 40. Strain of this type, between those two limits, is pseudoplastic strain, called such because upon unloading it appears to have plastically deformed, but when heated to the point that the SMA material 40 transforms to its austenite phase, that strain can be recovered, returning the SMA material 40 to the original length observed prior to being subjected to any applied loading.

The SMA material 40 may have any suitable composition. In particular, the SMA material 40 may include an element selected from the group including cobalt, nickel, titanium, indium, manganese, iron, palladium, zinc, copper, silver, gold, cadmium, tin, silicon, platinum, gallium, and combinations thereof. For example, suitable SMA materials 40 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The SMA material 40 can be binary, ternary, or any higher order so long as the SMA material 40 exhibits a shape memory effect, e.g., a change in shape orientation, damping capacity, and the like.

The actuator 24 is activated by the temperature of the fluid 18 being at least equal to the first temperature. When the actuator 24 is activated, actuator 24 acts on the sealing member 22 to apply a second force 56 to the sealing member 22 in the second longitudinal direction $L_2$, which is greater than the first force 38 applied by the biasing device in the first longitudinal direction $L_1$. As such, the second force 56 applied by the actuator 24 overcomes the first force 38 to move the sealing member 22 from the first position 34, shown in FIG. 3, to the second position 36, shown in FIG. 4. The fluid 18 is permitted to flow in a continuous loop from the device 12 to the valve 16, from the valve 16 to the cooler 14, and from the cooler 14 to the device when the sealing member 22 is in the second position 36, such that cooled fluid 18 is provided to cool the device 12. Thus, once the device 12 is cooled, such that the device 12 is outputting fluid 18 that is cooled, the SMA material 40 deactivates and the valve 16 returns to the first position 34, where the cooler 14 is once again bypassed.

With continued reference to FIGS. 3 and 4, the housing 20 defines the inlet 58, the first outlet 60, and the second outlet 62. The housing 20 also defines conduit 59 fluidly extending between an entry 61 to the housing and the inlet 58 to the cavity 28. The inlet 58 is configured to provide fluid communication from the device 12 to the cavity 28, regardless of whether the sealing member 22 is in the first position 34 or the second position 36. As such, the conduit 59 receives fluid 18 from the device 12, through the entry 61, and conveys the fluid 18 to the cavity 28, through the inlet 58. The conduit 59 may include a first conduit 59a and a second conduit that in fluid communication with one another. The first conduit 59a extends between the entry 61 and the second conduit 59b. The second conduit 59b fluidly extends between the first conduit 59a and the inlet 58. More specifically, the second conduit 59b fluidly extends relative to the first conduit 59a at an angle 53. The second conduit 59b opens to the cavity 28. The first end 30 of the housing 20 is bored to create the cavity 28 that opens from an access opening 65. Further, the housing 20 may be bored from within the cavity 28 to create the first conduit 59, extending at the angle 53 relative to the longitudinal axis A. A cap 63 covers the access hole 65 to seal the access hole 65 at the first end 30.

Providing such an angle 53 means that the flow of fluid 18 from the entry 61 to the inlet 58 is not linear. The first conduit 59a may extend linearly from the entry 61 to the second conduit 59b, such that the first conduit 59a extends in generally perpendicular relationship to the longitudinal axis A of the housing 20. The second conduit 59b may extend linearly from the first conduit 59a to the inlet 58, such that the second conduit 59b extends at the angle 53 relative to the first conduit 59a that is non-perpendicular. Therefore, the second conduit 59b does not extend in perpendicular relationship to the longitudinal axis A.

This configuration of the first and second conduits 59a, 59b allows the entry 61 to be placed at a location of the housing 20 that may not be aligned with the inlet 58 to the cavity 28 within the housing 20. More specifically, the entry 61 and the inlet 58 are not aligned to be in perpendicular relationship to the longitudinal axis A. Thus, a more compact valve 16 may be provided. Further, when the entry 61 is not aligned with the inlet 58 to the cavity 61, the first and second conduits 59a, 59b combine to route or direct the fluid 18 from the entry 61 to the inlet 58. The angle 53 of the first conduit 59a causes the fluid 18 to enter the cavity 28 in a direction that is not normal to the longitudinal axis A. The angled relationship between the first and second conduits 59a, 59b may be configured to change the velocity of fluid 18 entering the cavity 28 from the device 12, which may result in reducing turbulence of the fluid 18, thus, improving an efficiency of the valve 16.

With reference to FIG. 3, the first outlet 60 provides fluid communication from the cavity 28 to the device 12 when the sealing member 22 is in the first position 34. With reference to FIG. 4, the second outlet 62 provides fluid communication from the cavity 28 to the cooler 14 when the sealing member 22 is in the second position 36. Therefore, the device 12 is configured to receive fluid 18 from the valve 16 when the sealing member is in the first position 34 and to receive fluid from the cooler 14 when the sealing member 22 is in the second position 36.

Referring to FIGS. 3 and 4, a return passage 88 fluidly extends between the cooling exhaust port 84 and the device intake port 86. The return passage 88 intersects the cavity 28, downstream of the first outlet 60, such that the first outlet 60 merges with the return passage 88. As such, the first outlet 60 is in fluid communication with the return passage 88. The return passage 88 may extend through the housing 20 in perpendicular relationship to the longitudinal axis A.

With continued reference to FIGS. 3 and 4, the housing 20 includes a first sealing surface 68 within the cavity 28 that cooperates with the sealing member 22 to define the first outlet 60. The first sealing surface 68 faces the second end 32 of the housing 20. A first beveled surface 74 is beveled and converges from the first sealing surface 68, toward the first end 30 to define a second recess 76. The first beveled surface 74 is frustoconical in shape. The second recess 76 extends a second depth $D_2$ along the longitudinal axis A, from the first sealing surface 68 to the first reaction surface 42. Thus the first outlet 60 not only allows fluid 18 to flow from the cavity 28, but the first outlet 60 presents the opening to the second recess 76, which is also intersected by the return passage 88.

Referring to FIG. 3, the first face 48 of the sealing member 22 may be radially surrounded by a complimentary first seating face 72 that is also beveled, and thus frustoconical. The first seating face 72 is configured to abut the corresponding first beveled surface 74 when the sealing member 22 is in the second position 36, such that the sealing member 22 is in sealing contact relationship with the housing 20 to prevent fluid 18 from flowing from the cavity 28 through the first outlet 60. Therefore, in the second position 36, fluid 18 is permitted to flow from the cavity 28 through the second outlet 62, such that fluid 18 flows from the cavity 28 of the valve 16, from the valve 16 to the cooler 14, and from the cooler 14 to the device 12.

Likewise, referring to FIG. 4, the second reaction surface 44 presents a second sealing surface 70 within the cavity 28 that cooperates with the sealing member 22 to define the second outlet 62. The second outlet 62 may be defined by a valve seat having a second beveled surface 78 which converges from the second reaction surface 44, toward the second end 32.

The second face 50 of the sealing member 22 presents a second seating face 80 that is frustoconical and, thus, complimentary in shape to the second beveled surface 78. The second seating face 80 is configured to abut the corresponding second beveled surface 78 when the sealing member 22 is in the first position 34 to prevent fluid 18 from flowing from the cavity 28 through the second outlet 62. Thus, when the sealing member 22 is in the first position 34, the first seating face 72 of the sealing member 22 is not in sealing relationship with the corresponding first beveled surface 74 of the valve 16, and fluid 18 is permitted to flow from the cavity 28 through the first outlet 60.

With continued reference to FIGS. 3 and 4, the actuator 24 radially surrounds at least a portion of the barrel 46 such that the actuator 24 is disposed between the second side 66 of the sealing member 22 and the second reaction surface 44 as the sealing member 22 moves between the first position 34 and the second position 36.

The biasing device 26, when disposed between the first side 30 and the first reaction surface 42, extends a first length $S_1$, which is also oriented along the longitudinal axis A, and the actuator 24 extends a second length $S_2$, which is oriented along the longitudinal axis A. The first length $S_1$ may be longer than the second length $S_2$, irrespective of the temperature of the fluid 18 in the cavity 28. Further, the biasing device 26 has a first diameter $C_1$ and the actuator 24 has a second diameter $C_2$. The second diameter $C_2$ is larger than the first diameter $C_1$, irrespective of the temperature of the fluid 18 in the cavity 28. The difference in the size of the diameters $C_1$, $C_2$ allows the actuator 24 to radially surround the barrel 46, within which the biasing device 26 is partially disposed. Thus, the biasing device 26 is partially nested within the actuator 24 to reduce a length L of the valve 10 which is oriented in the direction of the longitudinal axis A. Further, the length of the valve 16 may be reduced, without compromising the first and second forces 38, 56 required to achieve the desired travel of the sealing member 22 between the first position 34 and the second position 36.

Referring specifically to FIG. 3, the fluid 18 is a sufficient number of degrees less than the first temperature and the actuator 24 is deactivated, such that the actuator 24 is longitudinally retracted. The longitudinally retracted actuator 24 acts on the sealing member 22 in the second longitudinal direction $L_2$ with the second force 56, while the biasing device 26 acts on the actuator 24 in the first longitudinal direction $L_1$ with the first force 38. When the actuator 24 is deactivated, i.e., "in a deactivated state", the first force 38 is greater than the second force 56, such that the first force 38 applied by the biasing device 26 causes the sealing member 22 to move from the second position 36 (FIG. 4) to the first position 34 (FIG. 3), or otherwise remain in the first position 34. In the first position 34, as discussed above, when the fluid 18 is a sufficient number of degrees less than the first temperature, cooling of the fluid 18 is not required. Therefore, the deactivated state of the actuator 24 allows the fluid 18 to exit the cavity 28 and return to the device 12.

Referring now to FIG. 4, the fluid 18 is at least equal to the first temperature and the actuator 24 is activated, such that the actuator 24 is longitudinally extended. The longitudinally extended actuator 24 acts on the sealing member 22 in the second longitudinal direction $L_2$ with the second force, while the biasing device 26 continues to act on the actuator 24 in the first longitudinal direction $L_1$ with the first force 38. When the actuator 24 is activated, i.e., "in an activated state", the first force 38 is less than the second force 56, such that the second force 56 applied by the actuator 24 causes the sealing member 22 to move from the first position 34 to the second position 36 (FIG. 4), or otherwise remain in the second position 36. In the second position 36, as discussed above, when the fluid 18 is at least equal to the first temperature, cooling of the fluid 18 is required. Therefore, the activated state of the actuator 24 prevents the fluid 18 from returning to the device 12 until the fluid 18 enters the cooler 14, and is cooled by the cooler 14.

Figure 5:
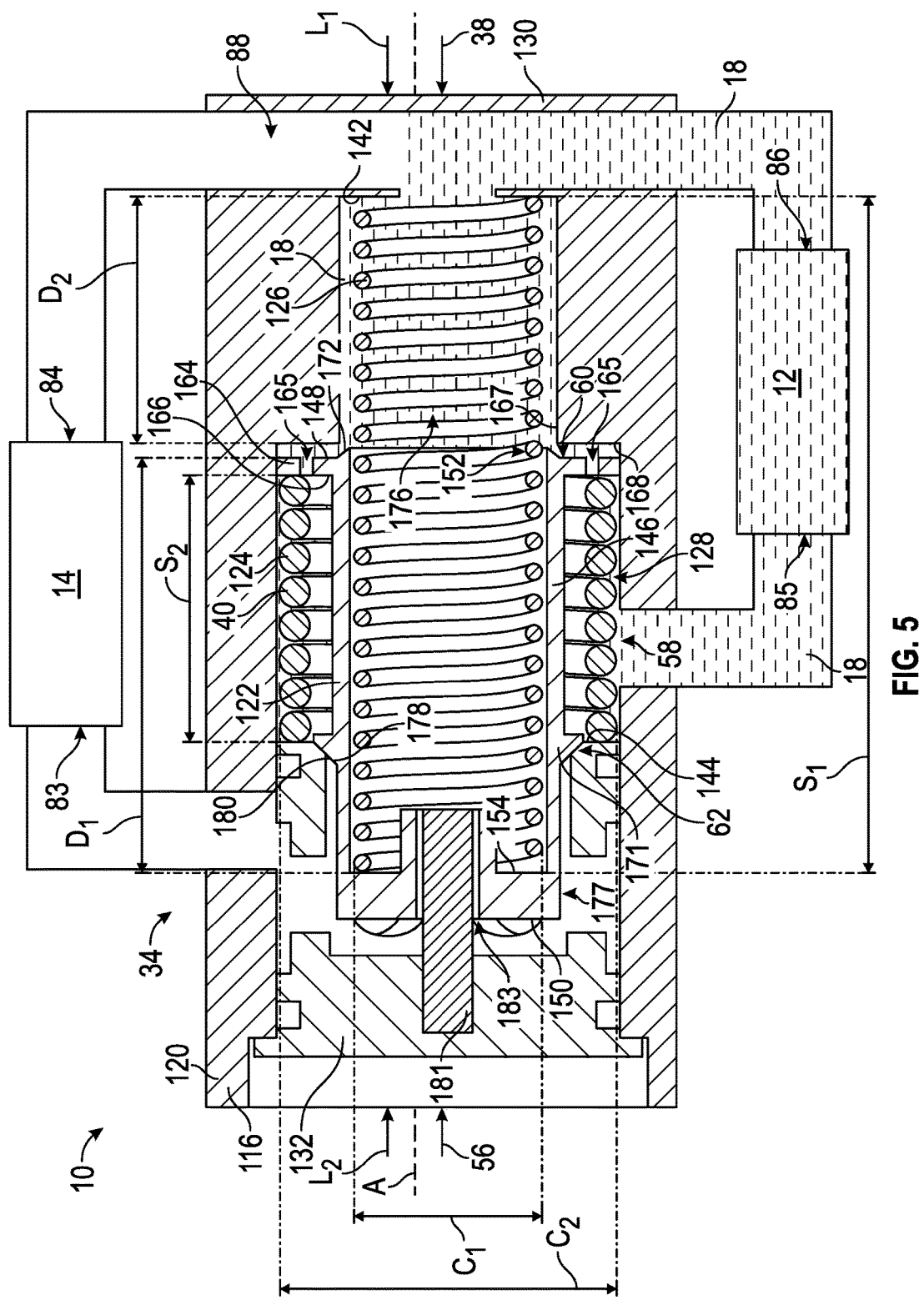
FIG. 5 is a schematic cross-sectional view of the second embodiment of the valve, shown in the first position.
Figure 6:
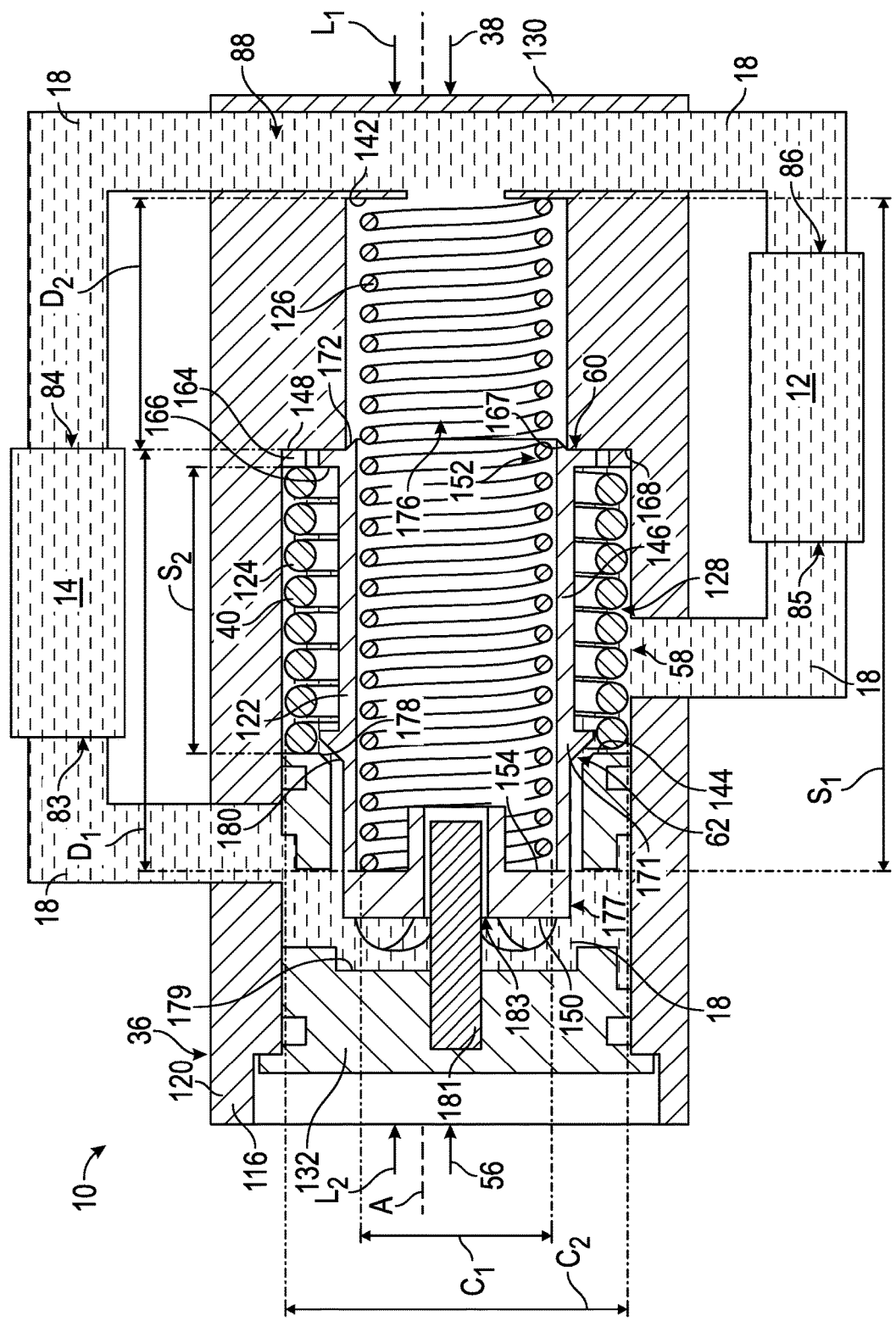
FIG. 6 is a schematic cross-sectional view of the valve of FIG. 5, shown in the second position.

Referring now to the embodiment of the valve 116 shown in FIGS. 5 and 6, the valve 116 includes a housing 120, a sealing member 122, an actuator 124, and a biasing device 126. The housing 120 defines a cavity 128 that extends along a longitudinal axis A between a first end 130 and a second end 132. The cavity 128 is configured for receiving and expelling the fluid 18. The housing 120 includes a first reaction surface 142 and a second reaction surface 144. The second reaction surface 144 is disposed along the longitudinal axis A in spaced and facing relationship to the first reaction surface 142.

The sealing member 122 is disposed in the cavity 128, between the first end 130 and the second end 132 of the housing 120. The sealing member 122 is movable within the cavity 128 along the longitudinal axis A between the first position 34 (FIG. 5) and the second position 36 (FIG. 6), as a function of the temperature of the fluid 18 within the cavity 128. The sealing member 122 extends along the longitudinal axis A, between a first face 148 and a second face 150, opposite the first face 148. The first face 148 of the sealing member 122 defines a first recess 152 that extends a first depth $D_1$ along the longitudinal axis A. The sealing member 122 includes a barrel 146 and a flange 164. The barrel 146 is generally cylindrically shaped and extends between the first face 148 and the second face 150. The flange 164 radially extends from the barrel 146 at, or proximate, the first face 148, such that the flange 164 at least partially surrounds the barrel 146. As such, the flange 164 and the barrel 146 may cooperate to present the first face 148, which is disposed in facing relationship to the first end 148 of the housing 120. The flange 164 also presents a second side 166, opposite the first face 148.

The flange 164 may define one or more vent holes 165 that extend between the first face 148 and the second side 166. The vent holes 165 are configured to allow fluid 18 to flow there through.

The biasing device 126 may be a compression spring. A portion of the biasing device 126 is disposed in each of the first recess 152 of the sealing member 122 and a second recess 176 of the housing 120, such that the biasing device 126 is operatively disposed between the first side 154 of the sealing member 122 and the first reaction surface 142 of the housing 120. Therefore, the biasing device 126 continuously reacts between the first side 154 of the sealing member 122 and the first reaction surface 142 of the housing 120 to apply a first force 38 to the sealing member 122, in the first longitudinal direction $L_1$ along the longitudinal axis A.

The actuator 124 may be a compression spring. The actuator 124 is operatively disposed within the cavity 128 between the second side 166 of the sealing member 122 and the second reaction surface 144 of the housing 120. The actuator 124 is configured to be in continuous fluid contact with the fluid 18. The actuator 124 is configured to react between the second side 166 and the second reaction surface 144 to apply a second force 56 to the sealing member in a second longitudinal direction $L_2$ along the longitudinal axis A, opposite the first longitudinal direction $L_1$.

The actuator 124 includes the SMA material 40 configured to be activated in response to the temperature of the fluid 18 in the cavity 128 having at least a first temperature such that the actuation of the smart material 40, activates the actuator 124, resulting in the actuator 124 longitudinally extending in length. Likewise, the SMA material 40 is configured to be deactivated in response to the fluid 18 in the cavity 128 having a sufficient number of degrees less than the first temperature, such that the SMA material 40 deactivates the actuator 124, and the actuator 124 longitudinally retracts in length. As such, due to the increase in length of the actuator when the actuator 124 is activated, the spring force, i.e., second force 56, applied by the actuator 124 becomes greater than when the actuator 124 is deactivated.

With continued reference to FIGS. 5 and 6, the inlet 58, the first outlet 60, and the second outlet 62 are shown. The inlet 58 is configured to provide fluid communication from the device 12 to the cavity 128, regardless of whether the sealing member 122 is in the first position 34 or the second position 36. With reference to FIG. 5, the first outlet 60 provides fluid communication from the cavity 128 to the device 12 when the sealing member 122 is in the first position 34. With reference to FIG. 6, the second outlet 62 provides fluid communication from the cavity 128 to the cooler 14 when the sealing member 122 is in the second position 36. Therefore, the device 12 is configured to receive fluid 18 from the valve 116 when the sealing member 122 is in the first position 34 and to receive fluid 18 from the cooler 14 when the sealing member 122 is in the second position 36.

The return passage 88 fluidly extends between the cooling exhaust port 84 and the device intake port 86. The return passage 88 intersects the cavity 128, downstream of the first outlet 60. As such, fluid 18 flowing through the first outlet 60 flows into the return passage 88. As illustrated in FIGS. 5 and 6, the return passage 88 may extend through the housing 120 in perpendicular relationship to the longitudinal axis A to provide a more compact valve 116.

The housing 120 presents a first sealing surface 168 within the cavity 128, proximate the first end 130. The first sealing surface 168 is disposed in facing relationship to each of the second end 132 of the housing 120 and the first face 148 of the sealing member 122. The first sealing surface 168 includes an inner edge 167 that defines an opening to a second recess 176. The second recess 176 extends a second depth $D_2$ along the longitudinal axis A, from the first sealing surface 168 to the first reaction surface 142. The first outlet 60 is defined between the first face 148 of the sealing member 122 and the first sealing surface 168 and allows fluid 18 to flow from the cavity 128, into the second recess 176, and then into the return passage 88.

Referring to FIG. 5, a first seating face 172 axially extends from the first face 148 of the barrel 146, such that the barrel 146 is at least partially surrounded by the flange 164. The first seating face 172 is beveled and tapers in a direction toward the longitudinal axis A, such that the first seating face 172 is at least partially surrounded by the flange 164. When the valve 116 is in the first position 34, as shown in FIG. 5, the first seating face 172 is not in sealing contact relationship with the inner edge 167. As such, the first outlet 60 is open, and fluid 18 flows out of the cavity 28 through the first outlet 60. However, when the valve 116 is in the second position 36, the first seating face 172 at least partially extends into the second recess 176, such that the first seating face 172 is in contact relationship with the first sealing surface 168 and the first seating face 172 is in sealing contact relationship with the inner edge 167 to prevent fluid 18 from flowing from the cavity 128 through the first outlet 60.

As such, when the valve 116 is in the second position 36, the second face 150 of the sealing member 122 is not in sealing contact relationship with the housing 120 so as to prevent fluid 18 from flowing from the cavity 128 through the second outlet 62. Therefore, in the second position 36, fluid 18 is permitted to flow from the cavity 128 through the second outlet 62 to the cooler 14, and from the cooler 14 to the device 12.

Referring to FIG. 6, the housing 120 defines a third recess 177 that extends along the longitudinal axis A, from the second reaction surface 144 to an end wall 179. The second reaction surface 144 radially surrounds a valve seat having a beveled surface 178 which converges from the second reaction surface 144 to define an opening to the third recess 177. The second outlet 62 is defined between the beveled surface 178 of the housing 120 and the sealing member 122. The second outlet 62 allows fluid 18 to flow from the cavity 128, along the third recess 177, and into the cooler 14 through the cooling intake port 83.

The sealing member 122 further includes a shoulder 171 that radially extends from the barrel 146, away from the longitudinal axis A. The shoulder 171 is longitudinally disposed between the flange 164 and the second face 150. The shoulder 171 presents a second seating face 180 that is frustoconical in shape, and, thus, complimentary in shape to the beveled surface 178. Therefore, when the sealing member 122 is in the first position 34, illustrated in FIG. 5, the second seating face 180 of the sealing member 122 contacts or is otherwise in sealing contact relationship with the corresponding beveled surface 178 of the housing 120. Thus, fluid 18 is prevented from flowing through the second outlet 62. At the same time when the sealing member 122 is in the first position 34, fluid 18 is allowed to flow from the cavity 128 to the device 12 through the first outlet 60.

In order to keep the sealing member 122 aligned along the longitudinal axis A during movement between the first and second positions 34, 36, a guide pin 181 may be provided. More specifically, the guide pin 181 may extend from the second end 132 of the housing 120, into a relief 183 defined in the second face 150 of the sealing member 122. The guide pin 181 remains at least partially disposed within the relief, regardless of the position of the valve 116. The guide pin 181 and the relief 183 are appropriately sized to allow linear movement along the longitudinal axis A, while keeping the sealing member 122 aligned relative to the longitudinal axis A at the second face 150. Further, the flange 164 may be appropriately sized to fit within the cavity 128 to allow linear movement along the longitudinal axis A, while keeping the sealing member 122 aligned relative to the longitudinal axis, at the first face 148.

With continued reference to FIGS. 5 and 6, the actuator 124 radially surrounds the barrel 146, such that the actuator 124 is disposed between the second side 166 of the flange 164 of the sealing member 122 and the second reaction surface 144. The biasing device 126 is disposed between the first side 154 of the sealing member 122 and the first reaction surface 142 of the housing 120. The biasing device 126 extends a first length $S_1$, which is oriented along the longitudinal axis A. The actuator 124 extends a second length $S_2$, which is oriented along the longitudinal axis A. The first length $S_1$ may be longer than the second length $S_2$, irrespective of the temperature of the fluid 18 in the cavity 128. Further, the biasing device 126 has a first diameter $C_1$ and the actuator 124 has a second diameter $C_2$. The second diameter $C_2$ is larger than the first diameter $C_1$, irrespective of the temperature of the fluid 18 in the cavity 128. The difference in the size of the diameters $C_1$, $C_2$ allows the actuator 124 to radially surround the barrel 146, within which the biasing device 126 is partially disposed. Thus, the biasing device 126 is nested within the actuator 124 to reduce a length L of the valve 10, without compromising the first and second forces 38, 56 required to achieve the desired travel of the sealing member 122 between the first position 34 and the second position 36.

Referring specifically to FIG. 5, the fluid 18 is a sufficient number of degrees less than the first temperature and the actuator 124 is deactivated, such that the actuator 124 is longitudinally retracted. The longitudinally retracted actuator 124 acts on the sealing member 122 in the second longitudinal direction $L_2$ with the second force 56, while the biasing device 126 acts on the actuator 124 in the first longitudinal direction $L_1$ with the first force 38. When the actuator 124 is deactivated, i.e., "in a deactivated state", the first force 38 is greater than the second force 56, such that the first force 38 applied by the biasing device 126 causes the sealing member 122 to move from the second position 36 (FIG. 6) to the first position 34 (FIG. 5), or otherwise remain in the first position 34. In the first position 34, as discussed above, when the fluid 18 is a sufficient number of degrees less than the first temperature, cooling of the fluid 18 is not required. Therefore, the deactivated state of the actuator 124 allows the fluid 18 to exit the cavity 128 and return to the device 12, thus bypassing the cooler 14.

Referring now to FIG. 6, the fluid 18 is at least equal to the first temperature and the actuator 124 is activated, such that the actuator 124 is longitudinally extended. The longitudinally extended actuator 124 acts on the sealing member 122 in the second longitudinal direction $L_2$ with the second force, while the biasing device 126 continues to act on the actuator 124 in the first longitudinal direction $L_1$ with the first force 38. When the actuator 124 is activated, i.e., "in an activated state", the first force 38 is less than the second force 56, such that the second force 56 applied by the actuator 124 causes the sealing member 122 to move from the first position 34 to the second position 36 (FIG. 6), or otherwise remain in the second position 36. In the second position 36, as discussed above, when the fluid 18 is at least equal to the first temperature, cooling of the fluid 18 is required. Therefore, the activated state of the actuator 124 prevents the fluid 18 from returning to the device 12 and directs fluid 18 to the cooler 14 for cooling.

Figure 7:
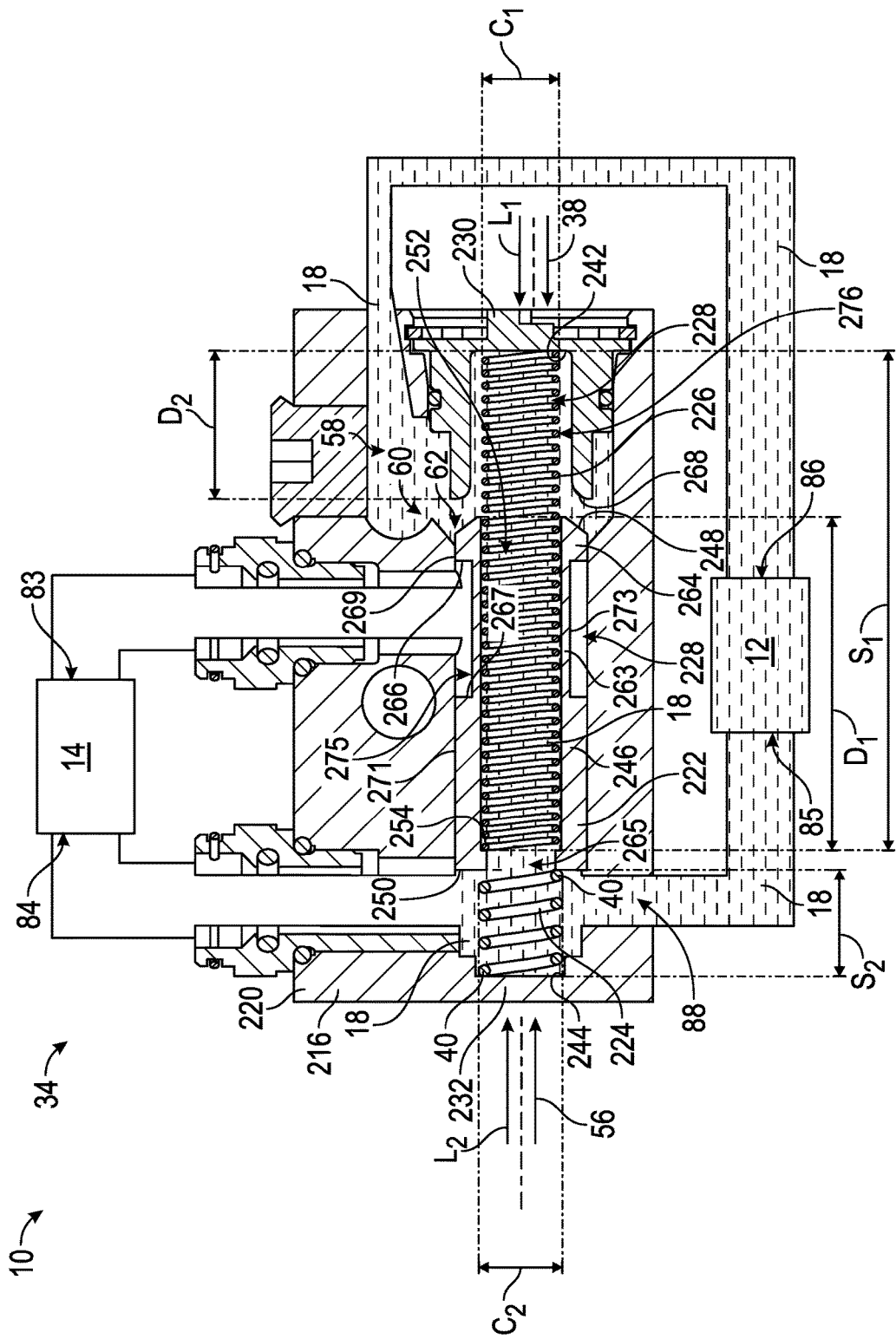
FIG. 7 is a schematic cross-sectional view of the third embodiment of the valve, shown in the first position.
Figure 8:
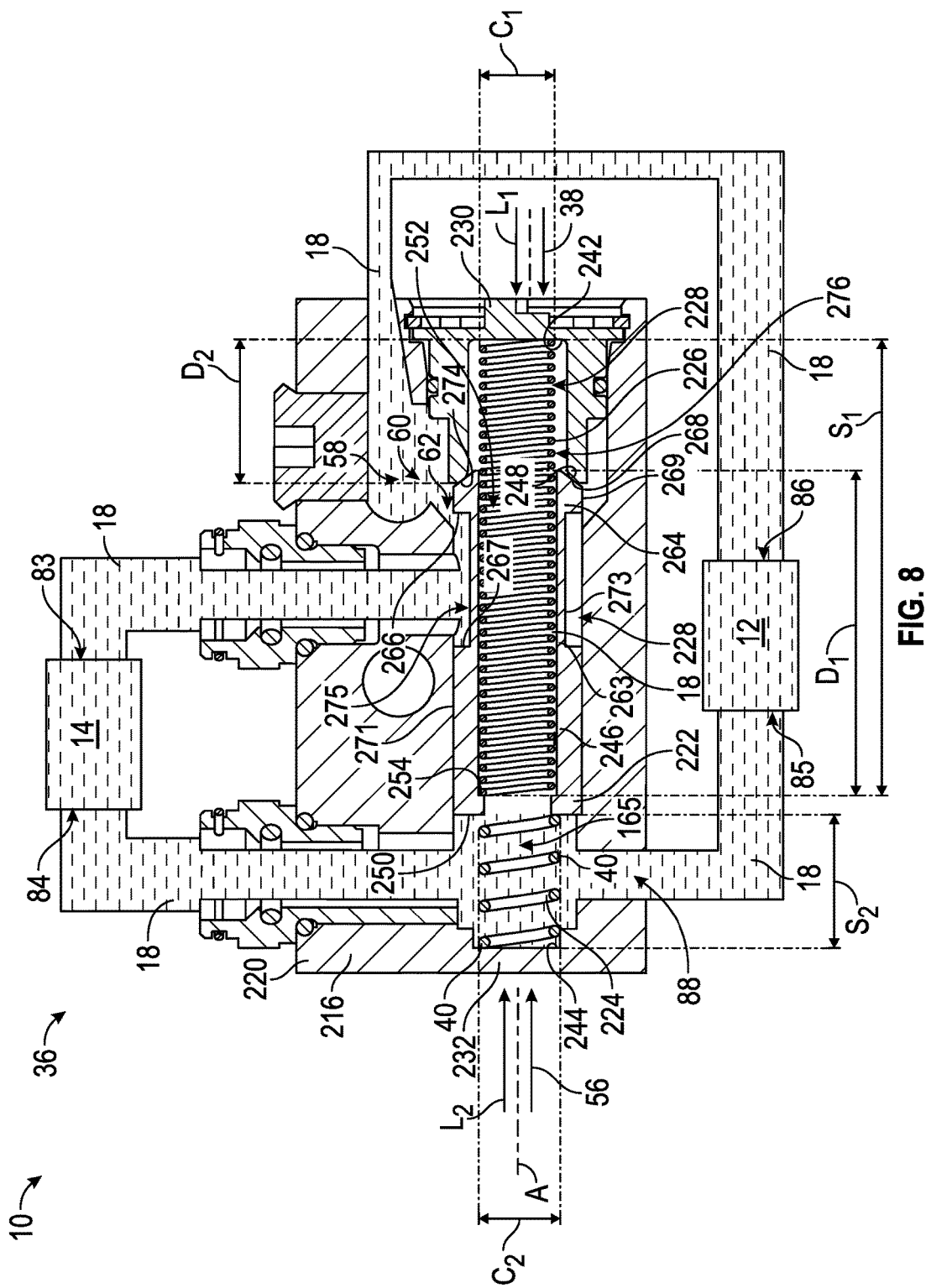
FIG. 8 is a schematic cross-sectional view of the valve of FIG. 7, shown in the second position.

Referring now to the embodiment of the valve 216 shown in the fluid circuit 10 in FIGS. 7 and 8, the valve 216 includes a housing 220, a sealing member 222, an actuator 224, and a biasing device 226. The housing 220 defines a cavity 228 that extends along a longitudinal axis A between a first end 230 and a second end 232. The cavity 228 is configured for receiving and expelling the fluid 18. The housing 220 includes a first reaction surface 242 and a second reaction surface 244. The second reaction surface 244 is disposed along the longitudinal axis A in spaced and facing relationship to the first reaction surface 242.

The sealing member 222 extends along the longitudinal axis A between a first face 248 and a second face 250. The first face 248 is operatively disposed in facing relationship to the first end 230 of the housing 220 and the second face 250 is disposed in facing relationship to the second end 232. The sealing member 222 includes a barrel 246, a flange 264, and an intermediate section 263 longitudinally disposed between the barrel 246 and the flange 264.

The flange 264 longitudinally extends from the intermediate section 263 and presents the first face 248 and a second side 266, longitudinally opposite the first face 248. The first face 248 is in facing relationship to the first end 230. A first wall 269 longitudinally interconnects the first face 248 and the second side 266, such that the first wall 269 radially surrounds the longitudinal axis A.

The barrel 246 longitudinally extends from the intermediate section 263, opposite the flange 264. The barrel 246 presents the second face 250, and a third side 267. The second face 250 is in facing relationship to the second end 232. A second wall 271 longitudinally interconnects the second face 250 and the third side 267, such that the second wall 271 radially surrounds the longitudinal axis A. The third side 267 is disposed in longitudinally spaced and facing relationship to the second side 266, and the intermediate section 263 is longitudinally disposed there between.

The second side 266, the third wall 273, the third side 267, and the housing 220 cooperate to define a groove 275 that radially surrounds the third wall 273. The groove 275 is in direct fluid communication with the cooling intake port 83 of the cooler 14, as explained in more detail below.

The barrel 246 and the flange 264 are radially sized to fit within the cavity 228 such that fluid 18 is prevented from passing within the cavity 228 between the housing 220 and each of the first wall 269 of the flange 264 the second wall 271 of the barrel 246. The intermediate section 263 is radially sized to be smaller than each of the barrel 246 and the flange 264 such that fluid 18 is allowed to flow into the groove 275, i.e., radially between the intermediate section 263 and the housing 220.

With continued reference to FIGS. 7 and 8, the first face 248 defines a first recess 252 that extends within the sealing member 222 a first depth $D_1$, along the longitudinal axis A to a first side 254. The first side 254 and the second face 250 cooperate to define a vent hole 265 that is configured to provide fluid communication from within the first recess 252, directly to the return passage 88. Further, a portion of the biasing device 226 is operatively disposed in the first recess 252. The first side 254 of the sealing member 222 is in facing relationship to the first end 230 and functions as a ledge or support surface to support the biasing device 226, while still allowing fluid 18 to pass through the vent hole 265.

The biasing device 226 may be a compression spring. The biasing device 226 is configured to operatively react between the first side 254 and the first reaction surface 242 of the housing 220. The biasing device 226 continuously reacts between the first side 254 of the sealing member 222 and the first reaction surface 242 of the housing 220 to apply a first force 38 to the sealing member 222, in the first longitudinal direction $L_1$, along the longitudinal axis A.

The housing 220 presents a first sealing surface 268 within the cavity 228. A first beveled surface 274 within the cavity 228 that is beveled and converges from the first sealing surface 268, toward the first end 230, to partially define a second recess 276. The first beveled surface 274 is disposed in facing relationship to each of the second end 232 of the housing 220 and the first face 248 of the sealing member 222. The second recess 276 extends a second depth $D_2$ along the longitudinal axis A, from the first sealing surface 268 to the first reaction surface 242. Another portion of the biasing device 226 is also disposed in the second recess 276.

The first outlet 60 is defined between the first sealing surface 268 and the first face 248. The second outlet 62 is defined between the first wall 269 and the housing 220. The sealing member 222 moves along the longitudinal axis A between the first position 34, shown in FIG. 7, and the second position 36, shown in FIG. 8. In the first position 34, the first face 248 is not in sealing contact relationship with the first beveled surface 274, such that the first outlet 60 is open and fluid 18 flow there through. In the first position 34, fluid 18 flows from the inlet 58 and enters the second recess 276 of the sealing member 222. The fluid 18 then flows from the second recess 276 and enters the first recess 252 of the sealing member 222. The fluid 18 flows through the first recess 252, exiting through the vent hole 265, where the fluid 18 flows to the device 12. At the same time when the valve 216 is in the first position 34, the first wall 269 of the flange 264 is in sealing relationship with the housing 220, and the second outlet 62 is closed. Thus, fluid 18 is prevented from flowing to the cooler 14.

Likewise, in the second position 36, the first face 248 of the sealing member 222 is in sealing contact relationship with the first beveled surface 274, such that the first outlet 60 is closed to prevent fluid 18 from flowing from the inlet 58 to the first recess 252. However, at the same time when the valve 216 is in the second position 36, the first wall 269 of the flange 264 is not in sealing contact relationship with the housing 220. Thus, the second outlet 62 is open to allow fluid 18 to flow from the inlet 58 to the groove 275, and from the groove 275 to the cooling intake port 83.

The first face 248 may be beveled, and thus, frustoconical, such that the first face 248 tapers in a direction toward the longitudinal axis A and the first end 230. Such beveling of the first face 248 and the first beveled surface 274 allows the first face 248 to be in the sealing contact relationship with the first beveled surface 274 when the valve 216 is in the second position 36.

The return passage 88 may extend through the housing 220 and fluidly extends between the cooling exhaust port 84 and the device intake port 86. The return passage 88 intersects the cavity 228, downstream of the first outlet 60 in the vent hole 265. As such, the return passage 88 shares a portion of the cavity 228.

The actuator 224 may be a compression spring. The actuator 224 is operatively disposed in the cavity 228 between the second face 250 and the second reaction surface 244. As such, the actuator 224, while being disposed in the cavity 228, is at least partially disposed in the portion of the return passage 88 that is shared with the cavity 228. The actuator 224 is configured to be in continuous fluid contact with the fluid 18.

The actuator 224 is configured to react between the second face 250 and the second reaction surface 244 to apply a second force 56 to the sealing member 222 in a second longitudinal direction $L_2$ along the longitudinal axis A, opposite the first longitudinal direction $L_1$.

The actuator 224 includes the SMA material 40 configured to be activated in response to the temperature of the fluid 18 in the cavity 228 having at least a first temperature such that the actuation of the smart material 40, activates the actuator 224, and the actuator 224 longitudinally extends in length. Likewise, the SMA material 40 is configured to be deactivated in response to the fluid 18 in the cavity 228 having a sufficient number of degrees less than the first temperature, such that the SMA material 40 deactivates the actuator 224, and the actuator 224 longitudinally retracts in length. As such, due to the increase in length of the actuator when the actuator 224 is activated, the spring force, i.e., second force 56, applied by the actuator 224 becomes greater than when the actuator 224 is deactivated.

With continued reference to FIGS. 7 and 8, the biasing device 226 extends a first length $S_1$, which is oriented along the longitudinal axis A. The actuator 224 extends a second length $S_2$, which is oriented along the longitudinal axis A. The first length $S_1$ may be greater larger than the second length $S_2$, irrespective of the temperature of the fluid 18 in the cavity 228. Further, the biasing device 226 has a first diameter $C_1$ and the actuator 224 has a second diameter $C_2$. The second diameter $C_2$ is larger than the first diameter $C_1$, irrespective of the temperature of the fluid 18 in the cavity 228.

Referring specifically to FIG. 7, the fluid 18 is a sufficient number of degrees less than the first temperature and the actuator 224 is deactivated, such that the actuator 224 is longitudinally retracted. The longitudinally retracted actuator 224 acts on the sealing member 222 in the second longitudinal direction $L_2$ with the second force 56, while the biasing device 226 acts on the actuator 224 in the first longitudinal direction $L_1$ with the first force 38. When the actuator 224 is deactivated, i.e., "in a deactivated state", the first force 38 is greater than the second force 56, such that the first force 38 applied by the biasing device 226 causes the sealing member 222 to move from the second position 36 (FIG. 8) to the first position 34 (FIG. 7), or otherwise remain in the first position 34. In the first position 34, as discussed above, when the fluid 18 is a sufficient number of degrees less than the first temperature, cooling of the fluid 18 is not required. Therefore, the deactivated state of the actuator 224 allows the fluid 18 to exit the cavity 228 and return to the device 12.

Referring now to FIG. 8, the fluid 18 is at least equal to the first temperature and the actuator 224 is activated, such that the actuator 224 is longitudinally extended. The longitudinally extended actuator 224 acts on the sealing member 222 in the second longitudinal direction $L_2$ with the second force, while the biasing device 226 continues to act on the actuator 224 in the first longitudinal direction $L_1$ with the first force 38. When the actuator 224 is activated, i.e., "in an activated state", the first force 38 is less than the second force 56, such that the second force 56 applied by the actuator 224 causes the sealing member 222 to move from the first position 34 to the second position 36 (FIG. 8), or otherwise remain in the second position 36. In the second position 36, as discussed above, when the fluid 18 is at least equal to the first temperature, cooling of the fluid 18 is required. Therefore, the activated state of the actuator 224 prevents the fluid 18 from returning to the device 12 until the fluid 18 enters the cooler 14, and is cooled by the cooler 14.

Figure 9:
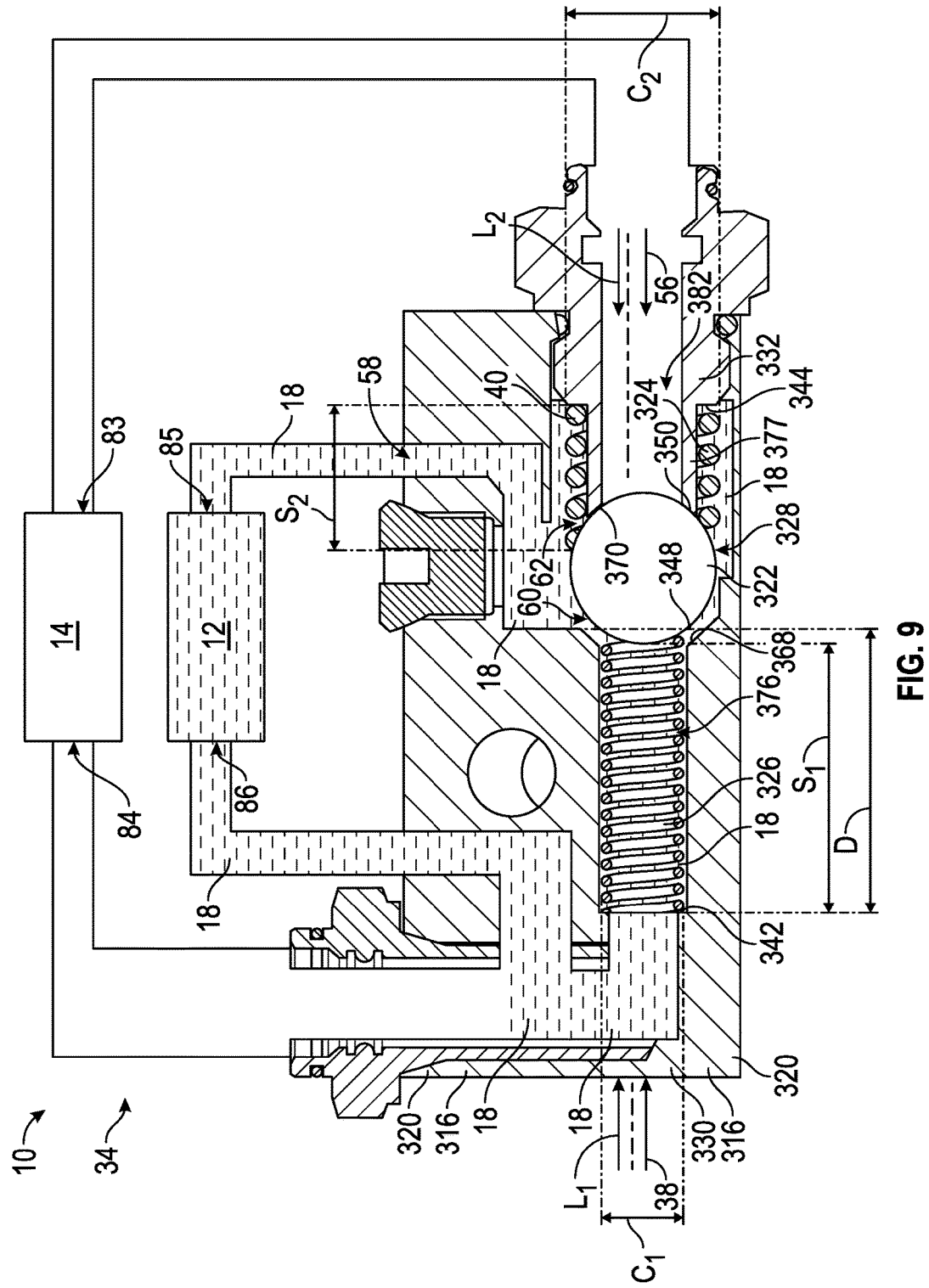
FIG. 9 is a schematic cross-sectional view of the fourth embodiment of the valve, shown in the first position.
Figure 10:
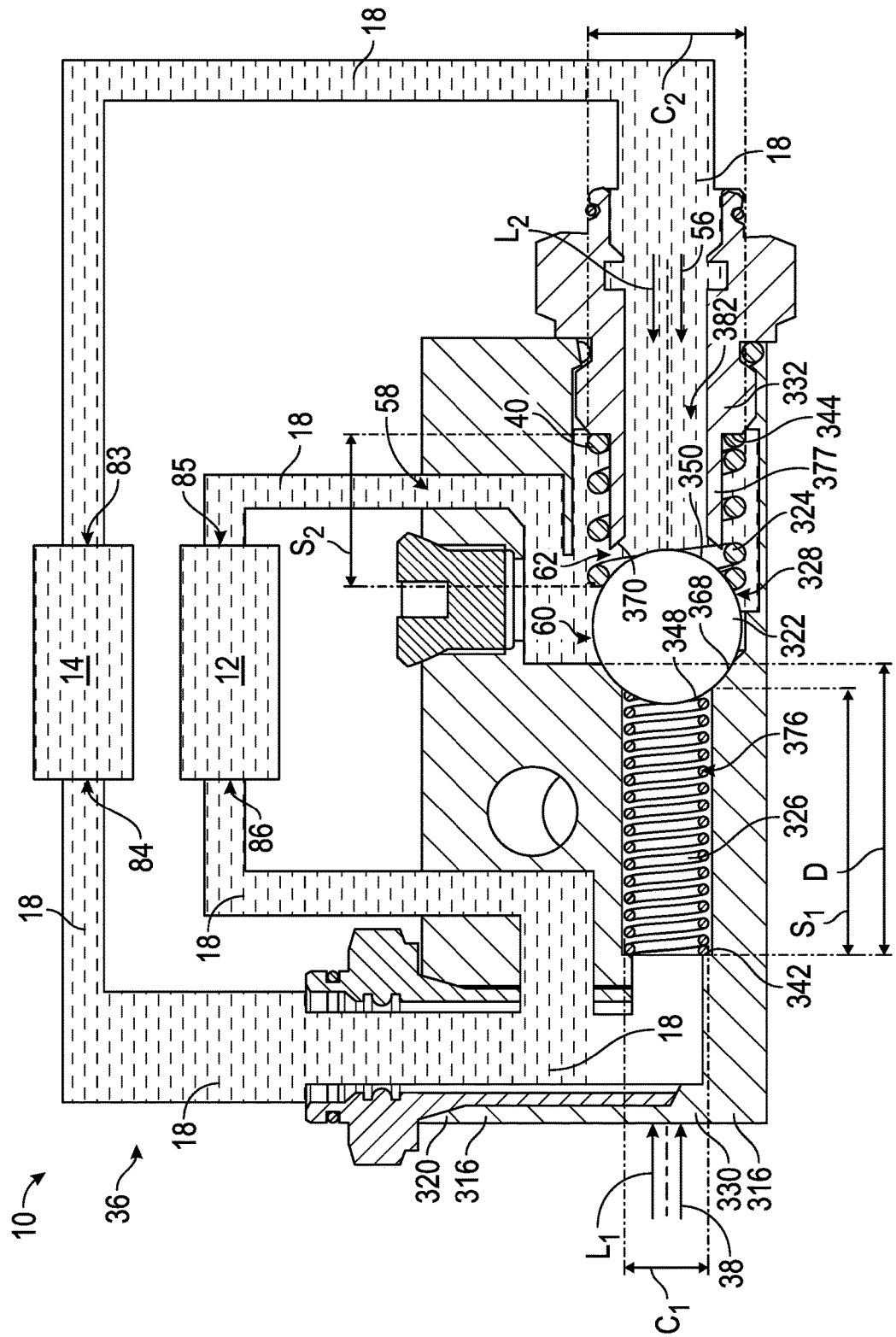
FIG. 10 is a schematic cross-sectional view of the valve of FIG. 9, shown in the second position.

Referring now to the embodiment of the valve 316 shown in the fluid circuit 10 in FIGS. 9 and 10, the valve 316 includes a housing 320, a sealing member 322, an actuator 324, and a biasing device 326. The housing 320 defines a cavity 328 that extends along a longitudinal axis A between a first end 330 and a second end 332. The cavity 328 is configured for receiving and expelling the fluid 18. The housing 320 includes a first reaction surface 342 and a second reaction surface 344. The second reaction surface 344 is disposed along the longitudinal axis A in spaced and facing relationship to the first reaction surface 342.

The sealing member 322 may be spherically shaped, i.e., ball shaped. The sealing member 322 presents a first face 348 and a second face 350, generally opposite the first face 348. The first face 348 is operatively disposed in facing relationship to the first end 330 of the housing 320 and the second face 350 is disposed in facing relationship to the second end 332.

The biasing device 326 may be a compression spring. The biasing device 326 is configured to operatively react between the first face 348 of the sealing member 322 and the first reaction surface 342 of the housing 320 to apply a first force 38 to the sealing member 322, in the first longitudinal direction $L_1$, along the longitudinal axis A.

The housing 320 presents a first sealing surface 368 within the cavity 328 that is disposed in facing relationship to the second end 332 of the housing 320 and the first face 348 of the sealing member 322. The housing 320 defines a recess 376 that extends a depth $D_1$ along the longitudinal axis A, from the first sealing surface 368 to the first reaction surface 342. The biasing device 326 is operatively disposed in the recess 376.

In the embodiment illustrated in FIGS. 9 and 10, since the sealing member 322 is spherically shaped, the first face 348 and the second face 350 are spherically shaped segments, i.e., dome shaped. The first sealing surface 368 may be beveled to correspond to the shape of first face 348. Such beveling of the first sealing surface 368 is configured to allow the first face 348 to be in the sealing contact relationship with the first sealing surface 368 when the valve 316 is in the second position 36, as illustrated in FIG. 10.

A tubular wall 377 longitudinally extends from the second reaction surface 344 to a second sealing surface 370. The tubular wall 377 surrounds the longitudinal axis A and defines an outlet passage 382 that is in fluid communication with the cooling intake port 83 of the cooler 14. The second sealing surface 370 is disposed in facing relationship to the first end 330 of the housing 320 and the second face 350 of the sealing member 322. The second sealing surface 370 may be beveled to correspond to the shape of the second face 350. Such beveling of the second sealing surface 370 is configured to allow the second face 350 to be in sealing contact relationship with the second sealing surface 370 when the valve 316 is in the first position 34, as illustrated in FIG. 9.

The actuator 324 radially surrounds the tubular wall 377, such that the actuator 324 reacts between the second reaction surface 344 and the second face 350 of the sealing member 322. The actuator 324 may be a compression spring. The actuator 324 is configured to be in continuous fluid contact with the fluid 18, regardless of the position 34, 36 of the valve 316. The actuator 324 is configured to react between the first face 348 and the second reaction surface 344 to apply a second force 56 to the sealing member 322 in a second longitudinal direction $L_2$ along the longitudinal axis A, opposite the first longitudinal direction $L_1$.

The first outlet 60 is defined between the first sealing surface 368 and the first face 348. The second outlet 62 is defined between the second sealing surface 370 and the second face 350. The sealing member 322 moves along the longitudinal axis A between the first position 34, illustrated in FIG. 9, and the second position 36, illustrated in FIG. 10. With reference to FIG. 9, when the valve 316 is in the first position 34, the first face 348 is not in sealing contact relationship with the first sealing surface 368, such that the first outlet 60 is open and allows fluid 18 to flow from the inlet 58, through the first outlet 60, and into the recess 376 of the cavity 328. The fluid 18 then flows from the recess 376, where the fluid 18 exits the valve 316 and enters the device 12 through the device intake port 86. Also when the valve 316 is in the first position 34, the second face 350 of the sealing member 322 is in sealing contact relationship with the second sealing surface of the housing 320. As such, the second outlet 62 is closed and does not allow fluid 18 to flow there through, and the valve 316 prevents the fluid 18 from passing from the valve 316 to the cooler 14.

Likewise, with reference to FIG. 10, when the valve 316 is in the second position 36, the first face 348 of the sealing member 322 is in sealing contact relationship with the first sealing surface 368, such that the first outlet 60 is closed and does not allow fluid 18 to flow into the recess 376. However, when the valve 316 is in the second position 36, the second face 350 of the sealing member 322 is not in sealing contact relationship with the second sealing surface 370, such that the second outlet 62 is open and allows fluid 18 to flow from the inlet 58, through the second outlet 62, where the fluid 18 enters the outlet passage 382. The fluid 18 then flows from the outlet passage 382, where the fluid 18 enters the cooler 14 via the cooling intake port 83.

The actuator 324 includes the SMA material 40 configured to be activated in response to the temperature of the fluid 18 in the cavity 328 having at least a first temperature such that the actuation of the smart material 40, activates the actuator 324, and the actuator 324 longitudinally extends in length. Likewise, the SMA material 40 is configured to be deactivated in response to the fluid 18 in the cavity 328 having a sufficient number of degrees less than the first temperature, such that the SMA material 40 deactivates the actuator 324, and the actuator 324 longitudinally retracts in length. As such, due to the increase in length of the actuator when the actuator 324 is activated, the spring force, i.e., second force 56, applied by the actuator 324 becomes greater than when the actuator 324 is deactivated.

With continued reference to FIGS. 9 and 10, the biasing device 326 extends a first length $S_1$, which is oriented along the longitudinal axis A. The actuator 324 extends a second length $S_2$, which is oriented along the longitudinal axis A. The first length $S_1$ may be longer than the second length $S_2$, irrespective of the temperature of the fluid 18 in the cavity 328. Further, the biasing device 326 has a first diameter $C_1$ and the actuator 324 has a second diameter $C_2$. The second diameter $C_2$ may be larger than the first diameter $C_1$, irrespective of the temperature of the fluid 18 in the cavity 328.

Referring again to FIG. 9, the fluid 18 is a sufficient number of degrees less than the first temperature and the actuator 324 is deactivated, such that the actuator 324 is longitudinally retracted. The longitudinally retracted actuator 324 acts on the sealing member 322 in the second longitudinal direction $L_2$ with the second force 56, while the biasing device 326 acts on the actuator 324 in the first longitudinal direction $L_1$ with the first force 38. When the actuator 324 is deactivated, the first force 38 is greater than the second force 56, such that the first force 38 applied by the biasing device 326 causes the sealing member 322 to move from the second position 36 (FIG. 10) to the first position 34 (FIG. 9), or otherwise remain in the first position 34. In the first position 34, as discussed above, when the fluid 18 is a sufficient number of degrees less than the first temperature, cooling of the fluid 18 is not required. Therefore, the deactivated state of the actuator 324 allows the fluid 18 to exit the cavity 328 and return directly to the device 12.

Referring now to FIG. 10, the fluid 18 is at least equal to the first temperature and the actuator 324 is activated, such that the actuator 324 is longitudinally extended. The longitudinally extended actuator 324 acts on the sealing member 322 in the second longitudinal direction $L_2$ with the second force, while the biasing device 326 continues to act on the actuator 324 in the first longitudinal direction $L_1$ with the first force 38. When the actuator 324 is activated, the first force 38 is less than the second force 56, such that the second force 56 applied by the actuator 324 causes the sealing member 322 to move from the first position 34 to the second position 36 (FIG. 10), or otherwise remain in the second position 36. In the second position 36, as discussed above, when the fluid 18 is at least equal to the first temperature, cooling of the fluid 18 is required. Therefore, the activated state of the actuator 324 prevents the fluid 18 from returning to the device 12 until the fluid 18 enters the cooler 14, and is cooled by the cooler 14.

Figure 11:
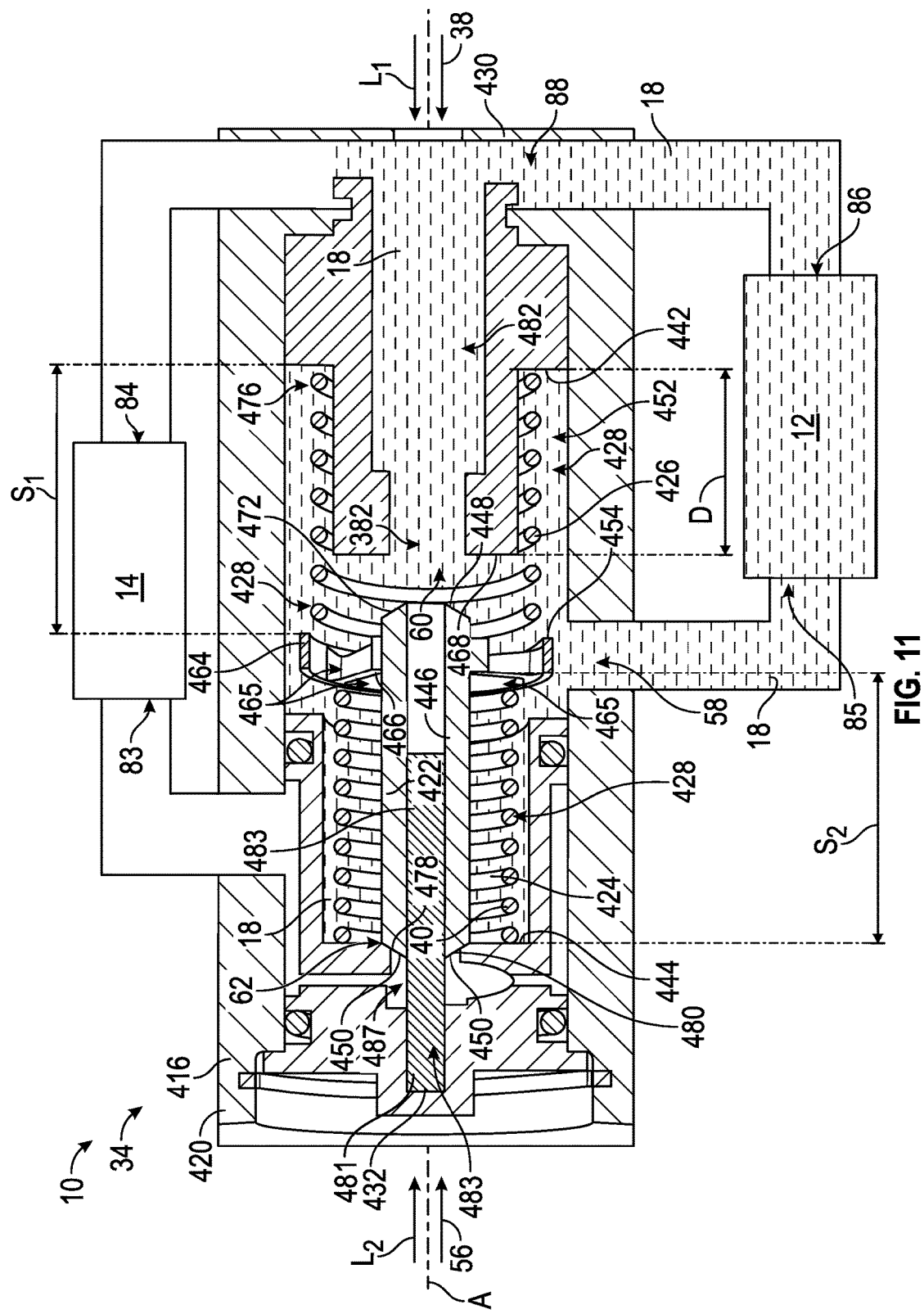
FIG. 11 is a schematic cross-sectional view of the fifth embodiment of the valve, shown in the first position.
Figure 12:
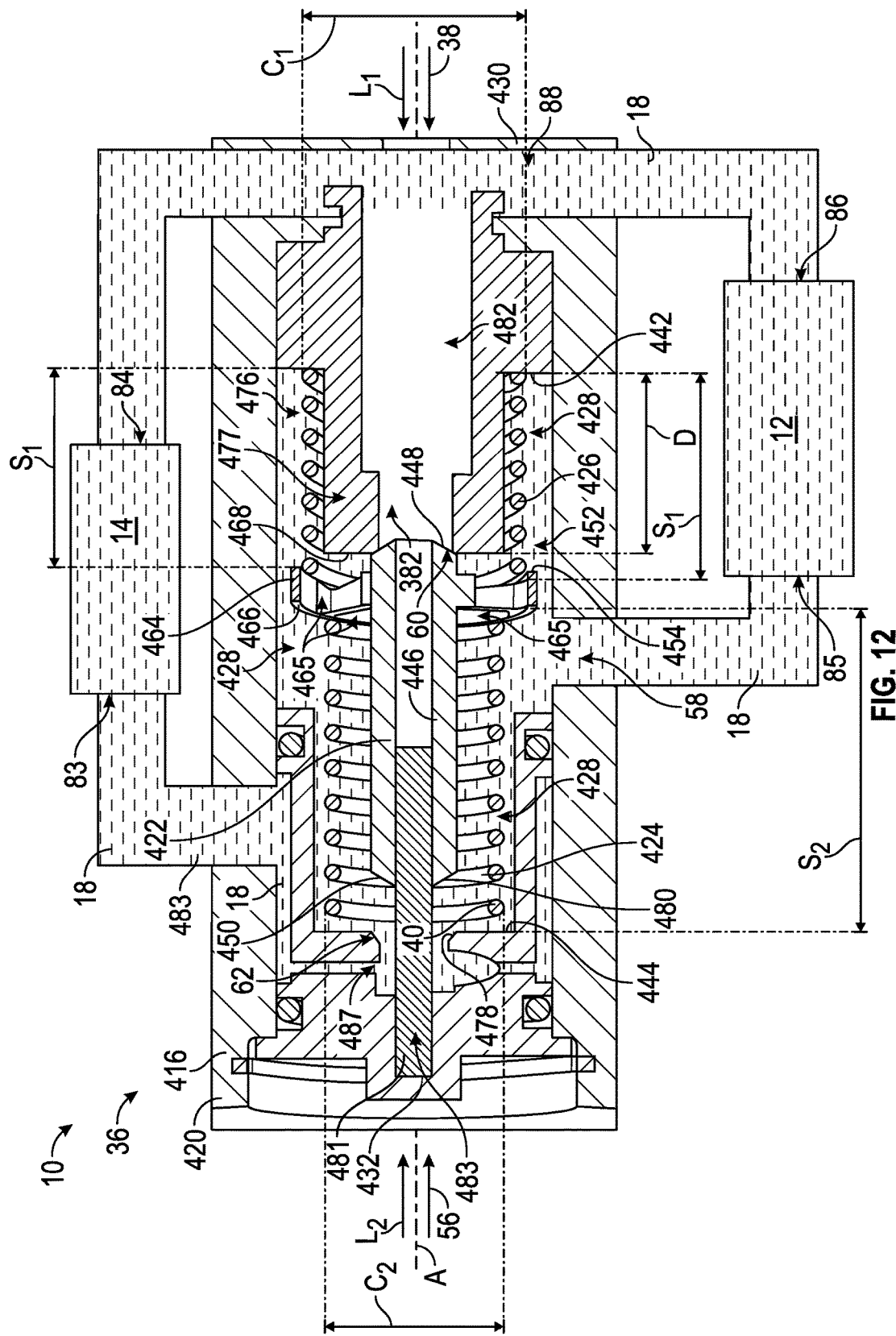
FIG. 12 is a schematic cross-sectional view of the valve of FIG. 11, shown in the second position.

Referring now to the embodiment of the valve 416 shown in FIGS. 11 and 12, the valve 416 includes a housing 420, a sealing member 422, an actuator 424, and a biasing device 426. The housing 420 defines a cavity 428 that extends along a longitudinal axis A between a first end 430 and a second end 432. The cavity 428 is configured for receiving and expelling the fluid 18. The housing 420 includes a first reaction surface 442 and a second reaction surface 444. The second reaction surface 444 is disposed along the longitudinal axis A in spaced and facing relationship to the first reaction surface 442.

The sealing member 422 is disposed in the cavity 428, between the first end 430 and the second end 432 of the housing 420. The sealing member 422 is movable within the cavity 428 along the longitudinal axis A between the first position 34 (FIG. 11) and the second position 36 (FIG. 12), as a function of the temperature of the fluid 18 within the cavity 428. The sealing member 422 includes a barrel 446 and a flange 464. The barrel 446 extends along the longitudinal axis A between a first face 448 and a second face 450. The flange 464 radially extends from the barrel 446 in generally perpendicular relationship to the longitudinal axis A. The flange 464 presents a first side 454 in facing relationship to the first reaction surface 442 and the first end 430 of the housing 420. The flange 464 also presents a second side 466, opposite the first side 454, such that the second side 466 is disposed in the cavity 428 in facing relationship to each of the second reaction surface 444 and the second end 432 of the housing 420.

The flange 464 may define one or more vent holes 465 that extend between the first face 448 and the second side 466. The vent holes 465 are configured to allow fluid 18 to flow there through.

A tubular wall 477 longitudinally extends from the first reaction surface 442 to a first sealing surface 468, such that the first reaction surface 442 radially surrounds the tubular wall 477. The tubular wall 477 surrounds the longitudinal axis A and defines an outlet passage 482. The first sealing surface 468 is disposed in facing relationship to each of the second end 432 of the housing 420 and the first face 448 of the sealing member 422. The first sealing surface 468 defines an opening to the outlet passage 482.

With continuing reference to FIGS. 11 and 12, the housing 420 presents a first sealing surface 468 within the cavity 428 that is disposed in facing relationship to the second end 432 of the housing 420 and the first face 448 of the sealing member 422. The first outlet 60 is at least partially defined by the first sealing surface 468. The housing 420 defines a recess 476 that extends a depth D along the longitudinal axis A, from the first sealing surface 468 to the first reaction surface 442. The first outlet 60 allows fluid 18 to flow from the cavity 428, along the recess 476, and into the return passage 88.

The biasing device 426 may be a compression spring. The biasing device 426 radially surrounds the tubular wall 477. The biasing device 426 is disposed in the recess 452 of the housing 420 such that the biasing device 426 is disposed to react between the first face 448 of the sealing member 422 and the first reaction surface 442 of the housing 420. Therefore, the biasing device 426 continuously reacts between the first face 448 of the sealing member 422 and the first reaction surface 442 of the housing 420 to apply a first force 38 to the sealing member 422, in the first longitudinal direction $L_1$ along the longitudinal axis A.

The actuator 424 includes the SMA material 40 configured to be activated in response to the temperature of the fluid 18 in the cavity 428 having at least a first temperature such that the actuation of the smart material 40, activates the actuator 424, and the actuator 424 longitudinally extends in length. Likewise, the SMA material 40 is configured to be deactivated in response to the fluid 18 in the cavity 428 having a sufficient number of degrees less than the first temperature, such that the SMA material 40 deactivates the actuator 424, and the actuator 424 longitudinally retracts in length. As such, due to the increase in length of the actuator when the actuator 424 is activated, the spring force, i.e., second force 56, applied by the actuator 424 becomes greater than when the actuator 424 is deactivated.

With continued reference to FIGS. 11 and 12, the housing 420 defines the inlet 58, the first outlet 60, and the second outlet 62. The inlet 58 is configured to provide fluid communication from the device 12 to the cavity 428, regardless of whether the sealing member 422 is in the first position 34, as illustrated in FIG. 11, or the second position 36, as illustrated in FIG. 12. With reference to FIG. 11, the first outlet 60 provides fluid communication from the cavity 428 to the device 12 when the sealing member 422 is in the first position 34. With reference to FIG. 12, the second outlet 62 provides fluid communication from the cavity 428 to the cooler 14 when the sealing member 422 is in the second position 36. Therefore, the device 12 is configured to receive fluid 18 from the valve 416 when the sealing member 422 is in the first position 34 and to receive fluid 18 from the cooler 14 when the sealing member 422 is in the second position 36.

A return passage 88 fluidly extends between the cooling exhaust port 84 and the device intake port 86. The return passage 88 may intersect the cavity 428, downstream of the first outlet 60. As such, fluid 18 flowing through the first outlet 60 and fluid 18 flowing from the cooling exhaust port 84 flows directly into the return passage 88. In one non-limiting example, the return passage 88 may extend through the housing 420 in perpendicular relationship to the longitudinal axis A.

Referring to FIG. 11, the first face 448 is beveled, and thus frustoconical, such that the first face 448 tapers in a direction toward the first end 430 and the longitudinal axis A. When the valve 416 is in the second position 36, the first face 448 at least partially extends into the outlet passage 482, such that the first face 448 and the first sealing surface 468 are each in sealing contact relationship with one another to prevent fluid 18 from flowing from the cavity 428 through the first outlet 60.

The second reaction surface 444 radially surrounds a valve seat having a beveled surface 478 which converges from the second reaction surface 444 to define the a cooling passage 487. The cooling passage 487 allows fluid 18 that passes through the second outlet 62 to flow into the cooler 14, through the cooling intake port 83.

The first face 448 of the sealing member 422 presents a first seating face 472 that is frustoconical and configured to be in sealing relationship with a corresponding edge of the first outlet 60 defined by the second sealing surface 468. The second face 450 of the sealing member 422 presents a second seating face 480 that is frustoconical and, thus, complimentary in shape to the second beveled surface 478. The second seating face 480 is configured to abut the corresponding second beveled surface 478 when the sealing member 422 is in the first position 34 to prevent fluid 18 from flowing from the cavity 428 through the second outlet 62. Thus, when the sealing member 422 is in the first position 34, the first seating face 472 of the sealing member 422 is not in sealing relationship with the corresponding edge of the first outlet 60, and fluid 18 is permitted to flow from the cavity 428 through the first outlet 60.

The barrel 446 presents the second face 450 of the sealing member 422. The second face 450 may be tapered so as to be frustoconical in shape. As such, the second face 450 is complimentary to the beveled surface 478. When the sealing member 422 is in the first position 34, the second face 450 of the sealing member 422 contacts or is otherwise in sealing relationship with the corresponding beveled surface 478 of the housing 420. Thus, in the first position 34, fluid 18 is prevented from flowing through the second outlet 62. Also, when the sealing member 422 is in the first position 34, fluid 18 is allowed to flow from the cavity 428 to the device 12 through the first outlet 60.

When the valve 416 is in the second position 36, the first sealing surface 468 and the first face 448 of the sealing member 422 are in sealing relationship with one another, while, at the same time, the second face 450 and the beveled surface 478 sealing member 422 are not in sealing contact relationship with one another to prevent fluid 18 from flowing from the cavity 428. Therefore, in the second position 36, fluid 18 is permitted to flow from the cavity 428 through the second outlet 62 to the cooler 14, and from the cooler 14 to the device 12. Likewise, when the valve 416 is in the first position 34, the second face 450 and the beveled surface 478 are in sealing contact relationship with one another to prevent fluid 18 from flowing from the cavity 428 through the second outlet 62.

In order to keep the sealing member 422 aligned along the longitudinal axis A as the sealing member 422 moves between the first and second positions 34, 36, a guide pin 481 may be provided. More specifically, the guide pin 481 may extend from the second end 432 of the housing 420, into a relief 483 defined in the second face 450 of the sealing member 422. The guide pin 481 remains at least partially disposed within the relief 483, regardless of the position of the valve 416. The guide pin 481 and the relief 483 are appropriately sized to allow linear movement of the sealing member 422 along the longitudinal axis A, while keeping the sealing member 422 aligned relative to the longitudinal axis A, at the second face 450. Further, the flange 464 may be appropriately sized to fit within the cavity 428 to allow linear movement along the longitudinal axis A, while keeping the sealing member 422 aligned relative to the longitudinal axis, at the first face 448.

With continued reference to FIGS. 11 and 12, the actuator 424 radially surrounds the barrel 446, such that the actuator 424 is disposed between the second side 466 of the flange 464 of the sealing member 422 and the second reaction surface 444. The biasing device 426 is disposed between the first side 454 of the flange 464 and the first reaction surface 442. The biasing device 426 extends a first length $S_1$, which is oriented along the longitudinal axis A. The actuator 424 extends a second length $S_2$, which is oriented along the longitudinal axis A. The first length $S_1$ may be longer larger than the second length $S_2$, irrespective of the temperature of the fluid 18 in the cavity 428. Further, the biasing device 426 has a first diameter $C_1$ and the actuator 424 has a second diameter $C_2$. The second diameter $C_2$ may be larger than the first diameter $C_1$, irrespective of the temperature of the fluid 18 in the cavity 428.

Referring specifically to FIG. 11, the fluid 18 is a sufficient number of degrees less than the first temperature and the actuator 424 is deactivated, such that the actuator 424 is longitudinally retracted. The longitudinally retracted actuator 424 acts on the sealing member 422 in the second longitudinal direction $L_2$ with the second force 56, while the biasing device 426 acts on the actuator 424 in the first longitudinal direction $L_1$ with the first force 38. When the actuator 424 is deactivated, i.e., "in a deactivated state", the first force 38 is greater than the second force 56, such that the first force 38 applied by the biasing device 426 causes the sealing member 422 to move from the second position 36 (FIG. 12) to the first position 34 (FIG. 11), or otherwise remain in the first position 34. In the first position 34, as discussed above, when the fluid 18 is a sufficient number of degrees less than the first temperature, cooling of the fluid 18 is not required. Therefore, the deactivated state of the actuator 424 allows the fluid 18 to exit the cavity 428 and return to the device 12.

Referring now to FIG. 12, the fluid 18 is at least equal to the first temperature and the actuator 424 is activated, such that the actuator 424 is longitudinally extended. The longitudinally extended actuator 424 acts on the sealing member 422 in the second longitudinal direction $L_2$ with the second force, while the biasing device 426 continues to act on the actuator 424 in the first longitudinal direction $L_1$ with the first force 38. When the actuator 424 is activated, i.e., "in an activated state", the first force 38 is less than the second force 56, such that the second force 56 applied by the actuator 424 causes the sealing member 422 to move from the first position 34 to the second position 36 (FIG. 12), or otherwise remain in the second position 36. In the second position 36, as discussed above, when the fluid 18 is at least equal to the first temperature, cooling of the fluid 18 is required. Therefore, the activated state of the actuator 424 prevents the fluid 18 from returning to the device 12 until the fluid 18 enters the cooler 14, and is cooled by the cooler 14.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A valve configured for directing the flow of fluid received from a device to one of the device and a cooler within a fluid circuit, the valve comprising:
 a housing defining a cavity extending along a longitudinal axis between a first end and a second end, wherein the cavity is configured for receiving and expelling the fluid;
 wherein the housing includes a first reaction surface and a second reaction surface, wherein the second reaction surface is disposed in spaced and facing relationship to the first reaction surface along the longitudinal axis;
 a sealing member disposed in the cavity and movable therein along the longitudinal axis between a first position and a second position, wherein the sealing member includes a barrel extending along the longitudinal axis between a first face and a second face;
 wherein the sealing member further includes a flange that radially surrounds the longitudinal axis and presents a second side, opposite the first face, such that the second side is disposed in facing relationship to the second reaction surface;
 wherein the flange defines at least one vent hole extending between the first face and the second face;
 a biasing device operatively disposed in the cavity to continuously react between the sealing member and the first reaction surface of the housing to apply a first force to the sealing member, in a first longitudinal direction; and
 an actuator radially surrounding the barrel such that the actuator is operatively disposed in the cavity to react between the second side of the flange of the sealing member and the second reaction surface of the housing to apply a second force to the sealing member, in a second longitudinal direction, opposite the first longitudinal direction;
 wherein the actuator is configured to be in continuous fluid contact with the fluid and the actuator includes a smart material configured to be activated in response to the temperature of the fluid in the cavity having at least a first temperature such that activation of the smart material activates the actuator;
 wherein the smart material is configured to be deactivated in response to a temperature of the fluid in the cavity being a sufficient number of degrees less than the first temperature such that the smart material deactivates the actuator;
 wherein the first force is greater than the second force when the actuator is deactivated, such that the sealing member moves in the first longitudinal direction from the second position to the first position;
 wherein the second force is greater than the first force when the actuator is activated, such that the sealing member moves in the second longitudinal direction from the first position to the second position;
 wherein the fluid is only permitted to flow between the cavity, the cooler, and the device when the sealing member is in the second position; and
 wherein the fluid is only permitted to flow from the cavity to the device and from the device to the cavity when the sealing member is in the first position.

2. The valve, as set forth in claim 1, further comprising a guide pin longitudinally extending in fixed relationship from the second end of the housing;
 wherein the second face of the sealing member defines a relief and a portion of the guide pin operatively extends into the relief, such that the guide pin the portion of the guide pin remains within the relief as the sealing member moves between the first position and the second position.

3. A valve configured for directing the flow of fluid received from a device to one of the device and a cooler within a fluid circuit, the valve comprising:
 a housing defining a cavity extending along a longitudinal axis between a first end and a second end, wherein the cavity is configured for receiving and expelling the fluid;
 wherein the housing defines an inlet, a first outlet, and a second outlet;
 wherein the housing includes a first reaction surface and a second reaction surface, wherein the second reaction surface is disposed in spaced and facing relationship to the first reaction surface along the longitudinal axis;
 a sealing member disposed in the cavity and movable therein along the longitudinal axis between a first position and a second position, wherein the sealing member includes a barrel extending along the longitudinal axis between a first face and a second face;
 wherein the inlet is configured to provide fluid communication from the device to the cavity when the sealing member is in each of the first position and the second position;
 wherein the first outlet is configured to provide fluid communication from the cavity to the device when the sealing member is in the first position;
 wherein the second outlet is configured to provide fluid communication from the cavity to the cooler when the sealing member is in the second position;
 wherein the device is configured to receive fluid from the cooler when the sealing member is in the second position;
 wherein the sealing member further includes a flange that radially surrounds the longitudinal axis and presents a second side, opposite the first face, such that the second side is disposed in facing relationship to the second reaction surface;
 wherein the first face of the sealing member is radially surrounded by a first seating face that is beveled;
 wherein the first seating face is configured to not be in sealing contact relationship with the housing when the sealing member is in the first position, such that fluid flows out of the cavity through the first outlet; and
 wherein the first seating face is configured to be in sealing contact relationship with the housing when the sealing member is in the second position, such that fluid is prevented from flowing from the cavity through the first outlet;
 a biasing device operatively disposed in the cavity to continuously react between the sealing member and the first reaction surface of the housing to apply a first force to the sealing member, in a first longitudinal direction; and an actuator radially surrounding the barrel such that the actuator is operatively disposed in the cavity to react between the second side of the flange of the sealing member and the second reaction surface of the housing to apply a second force to the sealing member, in a second longitudinal direction, opposite the first longitudinal direction;

wherein the actuator is configured to be in continuous fluid contact with the fluid and the actuator includes a smart material configured to be activated in response to the temperature of the fluid in the cavity having at least a first temperature such that activation of the smart material activates the actuator;

wherein the smart material is configured to be deactivated in response to a temperature of the fluid in the cavity being a sufficient number of degrees less than the first temperature such that the smart material deactivates the actuator;

wherein the first force is greater than the second force when the actuator is deactivated, such that the sealing member moves in the first longitudinal direction from the second position to the first position;

wherein the second force is greater than the first force when the actuator is activated, such that the sealing member moves in the second longitudinal direction from the first position to the second position;

wherein the fluid is only permitted to flow between the cavity, the cooler, and the device when the sealing member is in the second position; and wherein the fluid is only permitted to flow from the cavity to the device and from the device to the cavity when the sealing member is in the first position.

4. The valve, as set forth in claim 3, wherein the housing includes a first sealing surface disposed in facing relationship to the second end of the housing;

wherein the first sealing surface defines the first outlet;

wherein a first surface extends from the first sealing surface to radially surround the first outlet;

wherein the first surface is beveled and extends from the first sealing surface, toward the first end of the housing, to define a second recess;

wherein the first seating face is configured to not be in sealing contact relationship with the first surface of the housing when the sealing member is in the first position, such that fluid flows out of the cavity through the first outlet; and wherein the first seating face is configured to be in sealing contact relationship with the first surface of the housing when the sealing member is in the second position, such that fluid is prevented from flowing from the cavity through the first outlet.

5. The valve, as set forth in claim 3, wherein the second face of the sealing member is radially surrounded by a second seating face that is beveled;

wherein the second seating face is configured to be in sealing contact relationship with the housing when the sealing member is in the first position, such that fluid is prevented from flowing out of the cavity through the second outlet; and wherein the second seating face is configured to not be in sealing contact relationship with the housing when the sealing member is in the second position, such that fluid flows from the cavity through the second outlet.

6. The valve, as set forth in claim 5, wherein the second reaction surface of the housing presents a second sealing surface disposed in facing relationship to the first end of the housing;

wherein the second sealing surface defines the second outlet;

wherein a second surface extends from the second sealing surface to radially surround the second outlet;

wherein the second surface is beveled and extends from the second sealing surface, toward the second end of the housing, such that the second surface is complimentary to the second seating face;

wherein the second seating face is configured to be in sealing contact relationship with the second surface of the housing when the sealing member is in the first position, such that fluid is prevented from flowing out of the cavity through the second outlet; and wherein the second seating face is configured to not be in sealing contact relationship with the second surface of the housing when the sealing member is in the second position, such that fluid flows from the cavity through the second outlet.

7. The valve, as set forth in claim 3, wherein the housing, proximate the first end, and the sealing member cooperate to define the first outlet;

wherein the sealing member is configured to be in sealing relationship with the housing, proximate the first end, when the sealing member is in the second position, such that fluid is prevented from flowing from the cavity, through the first outlet, while fluid is permitted to flow from the cavity through the second outlet;

wherein the housing, proximate the second end, and the sealing member cooperate to define the second outlet; and wherein the sealing member is configured to not be in sealing relationship with the housing, proximate the first end, when the sealing member is in the first position, such that fluid permitted to flow from the cavity, through the first outlet, while fluid is prevented from flowing from the cavity, through the second outlet.

8. The valve, as set forth in claim 7, wherein the sealing member is configured to be in sealing relationship with the housing, proximate the second end, when the sealing member is in the first position, such that fluid is prevented from flowing from the cavity, through the second outlet, while fluid is permitted to flow from the cavity through the first outlet; and wherein the sealing member is configured to not be in sealing relationship with the housing, proximate the second end, when the sealing member is in the second position, such that fluid is permitted to flow from the cavity, through the second outlet, while fluid is prevented from flowing from the cavity, through the first outlet.

9. A valve configured for directing the flow of fluid received from a device to one of the device and a cooler within a fluid circuit, the valve comprising:

a housing defining a cavity extending along a longitudinal axis between a first end and a second end, wherein the cavity is configured for receiving and expelling the fluid;

wherein the housing includes a first reaction surface and a second reaction surface, wherein the second reaction surface is disposed in spaced and facing relationship to the first reaction surface along the longitudinal axis;

a sealing member disposed in the cavity and movable therein along the longitudinal axis between a first position and a second position, wherein the sealing member includes a barrel extending along the longitudinal axis between a first face and a second face;

wherein the sealing member further includes a flange that radially surrounds the longitudinal axis and presents a second side, opposite the first face, such that the second side is disposed in facing relationship to the second reaction surface;

a biasing device operatively disposed in the cavity to continuously react between the sealing member and the first reaction surface of the housing to apply a first force to the sealing member, in a first longitudinal direction;

wherein the biasing device extends a first length oriented along the longitudinal axis and the actuator extends a second length oriented along the longitudinal axis;

wherein the first length is longer than the second length, irrespective of the temperature of the fluid in the cavity;

wherein the biasing device has a first diameter and the actuator has a second diameter; and wherein the second diameter is larger than the first diameter, irrespective of the temperature of the fluid in the cavity; and an actuator radially surrounding the barrel such that the actuator is operatively disposed in the cavity to react between the second side of the flange of the sealing member and the second reaction surface of the housing to apply a second force to the sealing member, in a second longitudinal direction, opposite the first longitudinal direction;

wherein the actuator is configured to be in continuous fluid contact with the fluid and the actuator includes a smart material configured to be activated in response to the temperature of the fluid in the cavity having at least a first temperature such that activation of the smart material activates the actuator;

wherein the smart material is configured to be deactivated in response to a temperature of the fluid in the cavity being a sufficient number of degrees less than the first temperature such that the smart material deactivates the actuator;

wherein the first force is greater than the second force when the actuator is deactivated, such that the sealing member moves in the first longitudinal direction from the second position to the first position;

wherein the second force is greater than the first force when the actuator is activated, such that the sealing member moves in the second longitudinal direction from the first position to the second position;

wherein the fluid is only permitted to flow between the cavity, the cooler, and the device when the sealing member is in the second position; and wherein the fluid is only permitted to flow from the cavity to the device and from the device to the cavity when the sealing member is in the first position.

10. The valve, as set forth in claim 9, wherein the biasing device is a compression spring.

11. The valve, as set forth in claim 10, wherein the actuator is a compression spring.

12. A fluid circuit configured for regulating the flow of a fluid, the fluid circuit comprising:
a device configured for receiving and expelling the fluid;
a cooler configured for receiving, cooling, and expelling the fluid to the device;
a valve configured for directing the flow of fluid received from the device to one of the device and the cooler, as a function of a temperature of the fluid received from the device, wherein the valve includes:

a housing defining a cavity extending along a longitudinal axis between a first end and a second end, wherein the cavity is configured for receiving and expelling the fluid;

wherein the housing includes a first reaction surface and a second reaction surface, wherein the second reaction surface is disposed in spaced and facing relationship to the first reaction surface along the longitudinal axis;

wherein the housing defines an inlet, a first outlet, and a second outlet;

a sealing member disposed in the cavity and movable therein along the longitudinal axis between a first position and a second position, wherein the sealing member includes a barrel extending along the longitudinal axis between a first face and a second face;

wherein the inlet is configured to provide fluid communication from the device to the cavity when the sealing member is in each of the first position and the second position;

wherein the first outlet is configured to provide fluid communication from the cavity to the device when the sealing member is in the first position;

wherein the second outlet is configured to provide fluid communication from the cavity to the cooler when the sealing member is in the second position;

wherein the device is configured to receive fluid from the cooler when the sealing member is in the second position;

wherein the sealing member further includes a flange that radially surrounds the longitudinal axis and presents a second side, opposite the first face, such that the second side is disposed in facing relationship to the second reaction surface;

wherein the first face of the sealing member is radially surrounded by a first seating face that is beveled;

wherein the first seating face is configured to not be in sealing contact relationship with the housing when the sealing member is in the first position, such that fluid flows out of the cavity through the first outlet; and wherein the first seating face is configured to be in sealing contact relationship with the housing when the sealing member is in the second position, such that fluid is prevented from flowing from the cavity through the first outlet;

a biasing device operatively disposed in the cavity to continuously react between the sealing member and the first reaction surface of the housing to apply a first force to the sealing member, in a first longitudinal direction; and an actuator radially surrounding the barrel such that the actuator is operatively disposed in the cavity to react between the second side of the flange of the sealing member and the second reaction surface of the housing to apply a second force to the sealing member, in a second longitudinal direction, opposite the first longitudinal direction;

wherein the actuator is configured to be in continuous fluid contact with the fluid and the actuator includes a smart material configured to be activated in response to the temperature of the fluid in the cavity having at least a first temperature such that activation of the smart material activates the actuator;

wherein the smart material is configured to be deactivated in response to a temperature of the fluid in the cavity being a sufficient number of degrees less than the first temperature such that the smart material deactivates the actuator;

wherein the first force is greater than the second force when the actuator is deactivated, such that the sealing member moves in the first longitudinal direction from the second position to the first position;

wherein the second force is greater than the first force when the actuator is activated, such that the sealing member moves in the second longitudinal direction from the first position to the second position;

wherein the fluid is only permitted to flow between the cavity, the cooler, and the device when the sealing member is in the second position; and wherein the fluid is only permitted to flow from the cavity to the device and from the device to the cavity when the sealing member is in the first position.

13. The fluid circuit, as set forth in claim 12, wherein the housing, proximate the first end, and the sealing member cooperate to define the first outlet;

wherein the sealing member is configured to be in sealing relationship with the housing, proximate the first end, when the sealing member is in the second position, such that fluid is prevented from flowing from the cavity, through the first outlet, while fluid is permitted to flow from the cavity through the second outlet;

wherein the housing, proximate the second end, and the sealing member cooperate to define the second outlet;

wherein the sealing member is configured to not be in sealing relationship with the housing, proximate the first end, when the sealing member is in the first position, such that fluid permitted to flow from the cavity, through the first outlet, while fluid is prevented from flowing from the cavity, through the second outlet;

wherein the sealing member is configured to be in sealing relationship with the housing, proximate the second end, when the sealing member is in the first position, such that fluid is prevented from flowing from the cavity, through the second outlet, while fluid is permitted to flow from the cavity through the first outlet; and wherein the sealing member is configured to not be in sealing relationship with the housing, proximate the second end, when the sealing member is in the second position, such that fluid is permitted to flow from the cavity, through the second outlet, while fluid is prevented from flowing from the cavity, through the first outlet.

14. The fluid circuit, as set forth in claim 12, wherein each of the actuator and the biasing device is a compression spring.

* * * * *